United States Patent
Lee et al.

(10) Patent No.: US 12,445,568 B2
(45) Date of Patent: Oct. 14, 2025

(54) ELECTRONIC DEVICE, METHOD, AND NON-TRANSITORY COMPUTER-READABLE STORAGE MEDIA FOR DISPLAYING MEDIA CONTENT BASED ON USER'S LOCATION

(71) Applicant: Samsung Electronics Co., Ltd., Suwon-si (KR)

(72) Inventors: Juyeon Lee, Suwon-si (KR); Hyunjoo Kang, Suwon-si (KR); Hyojin Kim, Suwon-si (KR); Yeeun Choi, Suwon-si (KR); Hoon Han, Suwon-si (KR); Jiwoong Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/535,019

(22) Filed: Dec. 11, 2023

(65) Prior Publication Data
US 2024/0291941 A1  Aug. 29, 2024

Related U.S. Application Data

(63) Continuation of application No. PCT/KR2023/018930, filed on Nov. 22, 2023.

(30) Foreign Application Priority Data

Feb. 27, 2023  (KR) .................. 10-2023-0026352

(51) Int. Cl.
*H04N 5/74* (2006.01)
*G06T 7/62* (2017.01)
*G06V 10/141* (2022.01)

(52) U.S. Cl.
CPC .............. *H04N 5/74* (2013.01); *G06T 7/62* (2017.01); *G06V 10/141* (2022.01); *G06V 2201/07* (2022.01)

(58) Field of Classification Search
CPC .......... H04N 5/74; H04N 9/31; H04N 9/3135; G06T 7/62; G06V 10/141; G06V 2201/07
(Continued)

(56) References Cited

U.S. PATENT DOCUMENTS 8,165,409 B2  4/2012  Ritzau et al.
9,943,965 B2  4/2018  Moore
(Continued)

FOREIGN PATENT DOCUMENTS

JP  2019008676 A  1/2019
JP  6607624 B2  11/2019
(Continued)

OTHER PUBLICATIONS

Search Report and Written Opinion dated Mar. 15, 2024 issued in International Patent Application No. PCT/KR2023/018930.

*Primary Examiner* — Sherrie Hsia
(74) *Attorney, Agent, or Firm* — Nixon & Vanderhye P.C.

(57) ABSTRACT

In an electronic device according to an embodiment, the electronic device may include: an actuator configured to move the electronic device, a sensor, a projection assembly including light emitting circuitry, at least one processor, and a memory storing instructions. the instructions, when executed by one or more of the at least one processor, cause the electronic device to, in response to an input for playing a media content stored in the memory, identify an external object included in the media content. the instructions, when executed by one or more of the at least one processor, cause the electronic device to, in a first state in which an external object adjacent to the electronic device is identified, emit a light representing the media content, facing a direction adjacent to the external object, by controlling the projection assembly, based on data of the sensor. The present disclosure relates to a metaverse service for enhancing interconnectivity between a real object and a virtual object. For example,
(Continued)

the metaverse service may be provided through a network based on fifth generation (5G) and/or sixth generation (6G).

20 Claims, 16 Drawing Sheets

(58) Field of Classification Search
USPC .................................................. 348/744, 774
See application file for complete search history.

(56) References Cited

U.S. PATENT DOCUMENTS

| | | | |
|---|---|---|---|
| 10,893,245 | B1 | 1/2021 | Choi et al. |
| 11,161,236 | B2 | 11/2021 | Mallinson |
| 11,219,837 | B2 | 1/2022 | Rico et al. |
| 2010/0185328 | A1 | 7/2010 | Kim et al. |
| 2020/0198153 | A1* | 6/2020 | Cheon .................... G06N 3/08 |
| 2021/0383806 | A1 | 12/2021 | Kim et al. |
| 2023/0311328 | A1 | 10/2023 | Cho et al. |
| 2024/0032407 | A1 | 1/2024 | Wu et al. |

FOREIGN PATENT DOCUMENTS

| | | |
|---|---|---|
| KR | 10-2009-0023674 | 3/2009 |
| KR | 10-2011-0003705 | 1/2011 |
| KR | 20180038326 A | 4/2018 |
| KR | 10-2018-0134628 | 12/2018 |
| KR | 10-2020-0101221 | 8/2020 |
| KR | 102336246 B1 | 12/2021 |
| KR | 10-2022-0082130 | 6/2022 |
| WO | WO 2023/283990 A1 | 1/2023 |

* cited by examiner

ELECTRONIC DEVICE, METHOD, AND NON-TRANSITORY COMPUTER-READABLE STORAGE MEDIA FOR DISPLAYING MEDIA CONTENT BASED ON USER'S LOCATION

CROSS-REFERENCE TO RELATED APPLICATIONS

This application is a continuation of International Application No. PCT/KR2023/018930 designating the United States, filed on Nov. 22, 2023, in the Korean Intellectual Property Receiving Office and claiming priority to Korean Patent Application No. 10-2023-0026352, filed on Feb. 27, 2023, in the Korean Intellectual Property Office, the disclosures of each of which are incorporated by reference herein in their entireties.

BACKGROUND

Field

The present disclosure relates to an electronic device, a method, and a non-transitory computer-readable storage media for displaying media content based on a user's location.

Description of Related Art

An electronic device for visualizing information is being developed. The electronic device may include a television, a monitor, an electronic display, a beam projector, a mobile phone, and/or a tablet personal computer (PC). The electronic device may form a display area representing the information on one surface of the electronic device or on one surface outside the electronic device.

SUMMARY

In an electronic device according to an example embodiment, the electronic device may comprise: an actuator configured to move the electronic device, a sensor, a projection assembly comprising light emitting circuitry, at least one processor, and a memory storing instructions. The instructions, when executed by one or more of the at least one processor, may cause the electronic device to, in response to an input for playing a media content stored in the memory, identify an external object included in the media content. The instructions, when executed by one or more of the at least one processor, may cause the electronic device to, in a first state in which an external object adjacent to the electronic device is identified, emit a light representing the media content, facing a direction adjacent to the external object, by controlling the projection assembly, based on data of the sensor. The instructions, when executed by one or more of the at least one processor, may cause the electronic device to, in a second state distinct from the first state, based on identifying a space in which the media content is obtained, move to the space by controlling the actuator. The instructions, when executed by one or more of the at least one processor, may cause the electronic device to emit the light representing the media content, by controlling the projection assembly, based on identifying the electronic device moved to the space, using the data of the sensor.

In a method of operating an electronic device according to an example embodiment, the method may comprise, in response to an input for playing a media content stored in a memory, identifying an external object included in the media content. The method may comprise, in a first state in which an external object adjacent to the electronic device is identified, emitting a light representing the media content, facing a direction adjacent to the external object, by controlling a projection assembly, based on data of the sensor. The method may comprise, in a second state distinct from the first state, based on identifying a space in which the media content is obtained, moving to the space by controlling an actuator. The method may comprise emitting the light representing the media content, by controlling the projection assembly, based on identifying the electronic device moved to the space, using the data of the sensor.

A non-transitory computer readable storage medium storing one or more programs, the one or more programs, when executed by one or more of at least one processor of an electronic device, may cause the electronic device to, in response to an input for playing a media content stored in a memory, identify an external object included in the media content. The one or more programs, when executed by one or more of the at least one processor of the electronic device, may be configured to cause the electronic device to, in a first state in which an external object adjacent to the electronic device is identified, emit a light representing the media content, facing a direction adjacent to the external object, by controlling a projection assembly, based on data of a sensor. The one or more programs, when executed by one or more of the at least one processor of the electronic device, may be configured to cause the electronic device to, in a second state distinct from the first state, based on identifying a space in which the media content is obtained, move to the space by controlling an actuator. The one or more programs, when executed by one or more of the at least one processor of the electronic device, may be configured to cause the electronic device to emit the light representing the media content, by controlling the projection assembly, based on identifying the electronic device moved to the space, using the data of the sensor.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
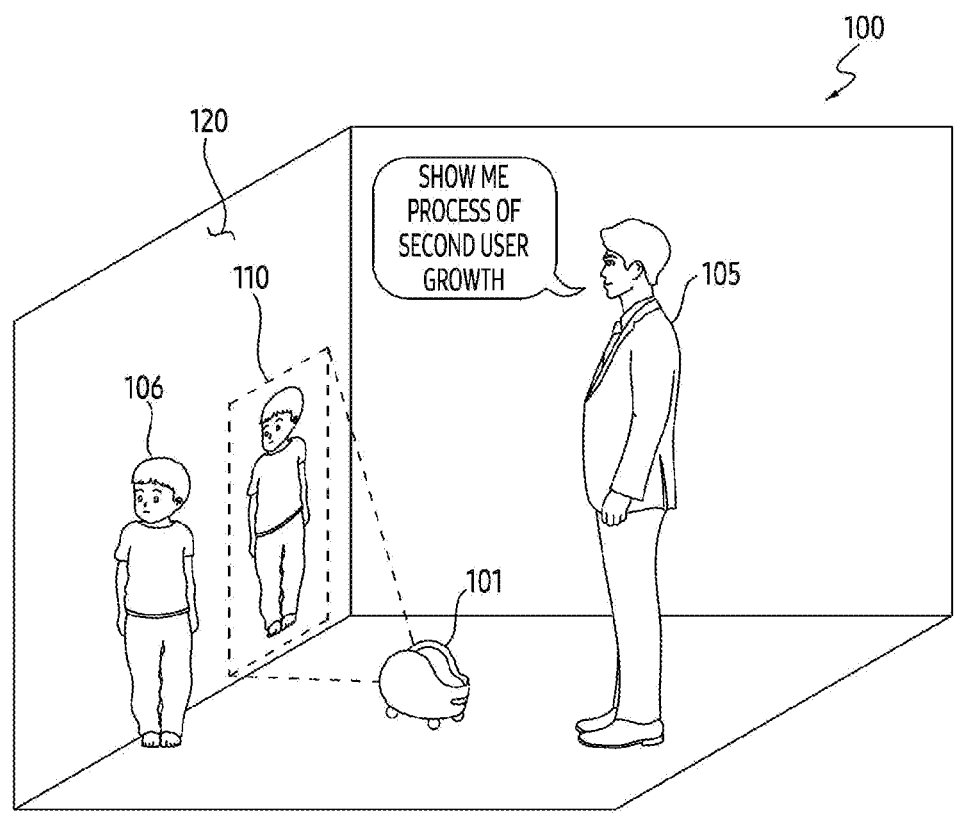
FIG. 1 is a diagram illustrating an example of an operation in which an electronic device displays media content according to an embodiment.

Hereinafter, various example embodiments of the present disclosure will be described in greater detail with reference to the accompanying drawings.

The various embodiments of the present disclosure and terms used herein are not intended to limit the technology described in the present disclosure to specific embodiments, and should be understood to include various modifications, equivalents, or substitutes of the corresponding embodiment. In relation to the description of the drawings, a reference numeral may be used for a similar component. A singular expression may include a plural expression unless it is clearly meant differently in the context. In the present disclosure, an expression such as "A or B", "at least one of A and/or B", "A, B or C", or "at least one of A, B and/or C", and the like may include all possible combinations of items listed together. Expressions such as "1st", "2nd", "first" or "second", and the like may modify the corresponding components regardless of order or importance, is only used to distinguish one component from another component, but does not limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the present disclosure may include a unit configured with hardware, software, firmware, or any combination thereof, and may be used interchangeably with terms such as logic, logic block, component, or circuit, and the like, for example. The module may be an integrally configured component or a minimum unit or part thereof that performs one or more functions. For example, a module may be configured with an application-specific integrated circuit (ASIC).

FIG. 1 is a diagram 100 illustrating an example of an operation in which an electronic device displays media content according to an embodiment. Referring to FIG. 1, the electronic device 101 according to an embodiment may include a beam projector for emitting light to an external space. The electronic device 101 may emit the light representing a screen (e.g., a media content 110) formed, for example, and without limitation, by two-dimensionally arranged pixels. The light emitted from the electronic device 101 may be reflected by an object such as a flat surface 120. A user (e.g., a first user 105) may view the screen based on the light reflected by the object.

Referring to FIG. 1, the electronic device 101 according to an embodiment may identify at least one flat surface (e.g., the flat surface 120) on which a screen (e.g., a media content 110) represented by the light is projectable, within an external space in which light emitted by the electronic device 101 is reachable. The electronic device 101 may use user information stored in a memory to identify the at least one flat surface. The electronic device 101 may identify an external object (e.g., a second user 106) included in the media content 110 using a camera. The electronic device 101 may identify an external object indicated by the user information using the camera. The media content 110 may include an image and/or video representing the external object.

For example, the electronic device 101 may identify the flat surface 120 adjacent to the external object based on identifying the external object. The electronic device 101 may display the media content 110 on the flat surface 120 based on identifying the external object (e.g., the second user 106) and/or the flat surface 120. For example, in case that the electronic device 101 fails to identify the external object (e.g., the second user 106), the electronic device 101 may identify spatial information from which the media content 110 was obtained. The electronic device 101 may display the media content 110 on a flat surface indicated by the spatial information, by controlling a projection assembly, using the spatial information. The electronic device 101 may move to the flat surface using an actuator to display the media content 110 on the flat surface. An operation in which the electronic device 101 displays the media content 110 on the flat surface indicated by the spatial information will be described in greater detail below with reference to FIG. 3.

The electronic device 101 according to an embodiment may receive a voice signal for playing media content 110 from the first user 105 using the microphone of the electronic device 101. The electronic device 101 may identify media content information stored in the memory based on receiving the voice signal. Based on identifying the media content information, the electronic device 101 may obtain spatial information, event information, and/or external object information corresponding to the media content information. Based on identifying the spatial information, the event information, and/or the external object information, the electronic device 101 may identify the media content 110 to be displayed on at least one flat surface, by controlling the projection assembly.

For example, the spatial information may include information indicating the location and/or angle in a space at which the electronic device 101 obtains the media content using the camera. The electronic device 101 may identify a space to display the media content 110 and/or a flat surface in the space using the spatial information.

For example, the external object information may refer, for example, to information indicating an external object included in the media content 110. The external object may be matched to user information stored in the memory of the electronic device 101. The external object may include an object representing a space, such as a living room, a kitchen, a bedroom, and/or a study. The electronic device 101 may distinguish between the external object (e.g., the second user 106) and the first user 105 who provided the voice signal, using the user information.

For example, the external object information may include information related to the external object included in the media content 110. The information related to the external object may include information on a size of the external object and/or information on a state of the external object (e.g., an external object based on moving motion).

For example, the event information may be obtained based on the electronic device 101 identifying a sound signal that is greater than or equal to a specified threshold (e.g., decibel (dB)) through a microphone. The event information may be obtained based on identifying a change in the external object in the space, using an image indicating a space obtained by the electronic device 101 through the camera. For example, the electronic device 101 may obtain event information, based on identifying an event such as a change in the location of an external object in the space, using the camera. Based on obtaining the event information, the electronic device 101 may obtain the media content indicating that the location of the external object is changed, using the camera.

As described above, the electronic device 101 according to an embodiment may identify the external object (e.g., the second user 106) included in the media content 110, in response to an input (e.g., the voice signal) for playing the media content 110 from the first user 105. Based on identifying the external object included in the media content 110, the electronic device 101 may initiate driving the camera to identify the second user 106 corresponding to the external object within the space where the electronic device 101 is located. In case that the electronic device 101 identifies the external object adjacent to the electronic device 101 using the camera, the electronic device 101 may emit light representing the media content 110 toward a direction adjacent to the external object by controlling the projection assembly. In case that the electronic device 101 fails to identify the external object adjacent to the electronic device 101, the electronic device 101 may move, using the actuator, to the location where the media content 110 was obtained, using the spatial information. The electronic device 101 may display the media content 110 on a flat surface disposed at the location, by controlling the projection assembly, based on identifying the electronic device 101 moved to the location. The electronic device 101 may enhance the user experience related to the media content 110, by changing the location where the media content 110 will be displayed, using the spatial information.

Figure 2:
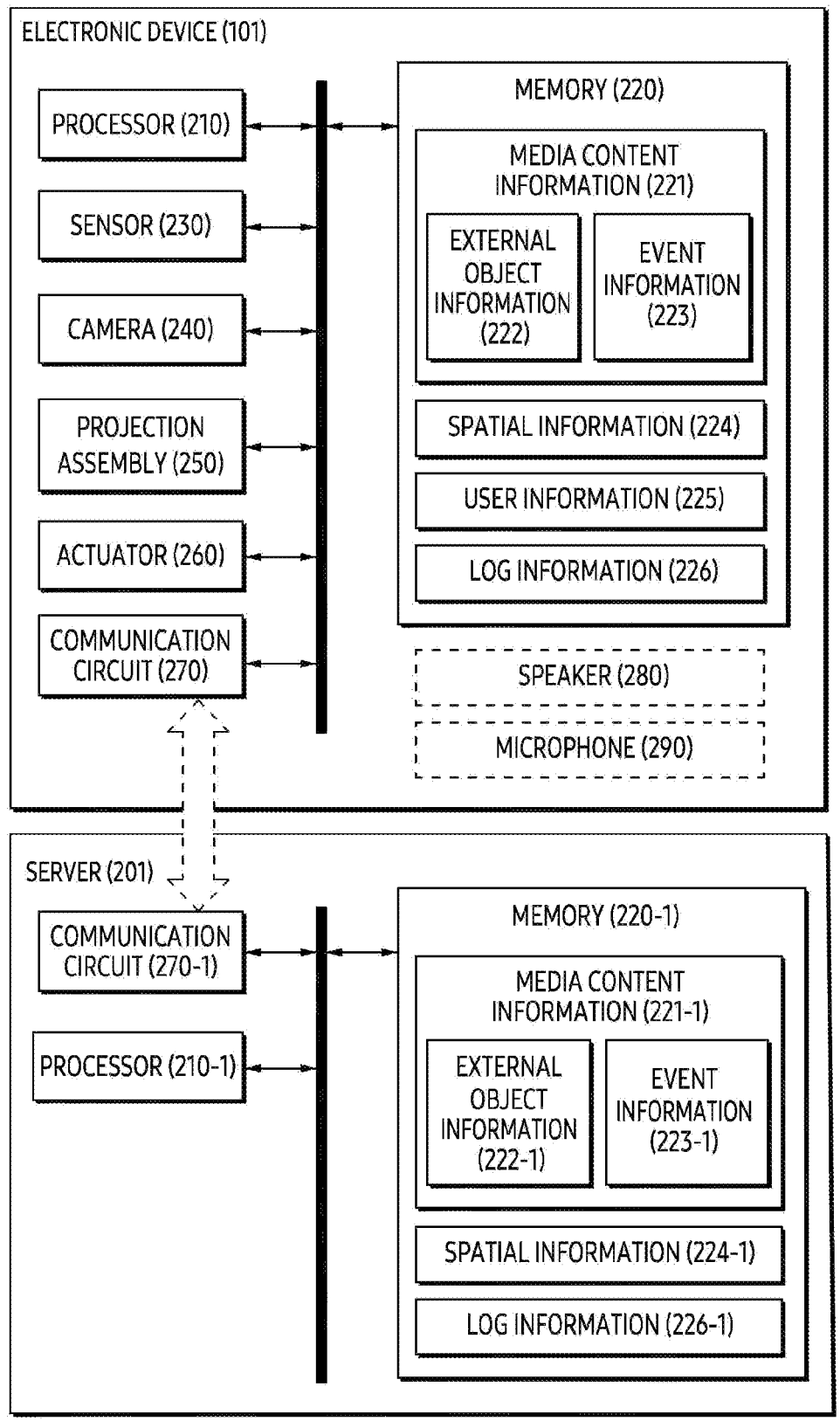
FIG. 2 is a block diagram illustrating an example configuration of an electronic device according to an embodiment.

FIG. 2 is a block diagram illustrating an example configuration of an electronic device according to an embodiment. An electronic device 101 of FIG. 2 may include the electronic device 101 of FIG. 1. Referring to FIG. 2, the electronic device 101 and a server 201 may be connected to each other based on a wired network and/or a wireless network. The wired network may include a network such as the Internet, a local area network (LAN), a wide area network (WAN), Ethernet, or a combination thereof. The wireless network may include a network such as long term evolution (LTE), 5G new radio (NR), wireless fidelity (WiFi), Zigbee, near field communication (NFC), Bluetooth, bluetooth low-energy (BLE), or a combination thereof. Although the electronic device 101 and the server 201 were illustrated to be directly connected, the electronic device 101 and the server 201 may be indirectly connected through an intermediate node (e.g., a router and/or an access point (AP)).

Referring to FIG. 2, according to an embodiment, the electronic device 101 may include at least one of a processor (e.g., including processing circuitry) 210, a memory 220, a camera 240, a projection assembly (e.g., including light emitting circuitry) 250, an actuator 260, a communication circuit 270, a speaker 280, and/or a microphone 290. The processor 210, the memory 220, the camera 240, the projection assembly 250, the actuator 260, the communication circuit 270, the speaker 280, and the microphone 290 may be electronically and/or operably coupled with each other by a communication bus. Hereinafter, that hardware is operably coupled may refer, for example, to a direct connection or an indirect connection between hardware being established wired or wirelessly so that a second hardware is controlled by a first hardware among the hardware. Although illustrated based on different blocks, embodiments are not limited thereto, and some (e.g., at least some of the processor 210, the memory 220, and the communication circuit 270) of the hardware of FIG. 2 may be included in a single integrated circuit such as a system on a chip (SoC). The type and/or number of hardware components included in the electronic device 101 are not limited to those illustrated in FIG. 2. For example, the electronic device 101 may include only some of the hardware components illustrated in FIG. 2.

According to an embodiment, the processor 210 of the electronic device 101 may include various processing circuitry (as used herein, including the claims, the term "processor" may include various processing circuitry, including at least one processor, wherein one or more processors of at least one processor may be configured to perform the various functions described herein) and may include a hardware component for processing data based on one or more instructions. The hardware component for processing data may include, for example, an arithmetic and logic unit (ALU), a floating point unit (FPU), a field programmable gate array (FPGA), a central processing unit (CPU), and/or an application processor (AP). The number of processors 210 may be one or more. For example, the processor 210 may have a multi-core processor structure such as a dual core, a quad core, or a hexa core.

According to an embodiment, the memory 220 of the electronic device 101 may include a hardware component for storing data and/or instructions inputted and/or outputted to the processor 210. The memory 220 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multi media card (eMMC).

According to an embodiment, within the memory 220 of the electronic device 101, one or more instructions (or commands) indicating calculations and/or operations to be performed on data by the processor 210 may be stored. A set of one or more instructions may be referred to as a firmware, an operating system, a process, a routine, a sub-routine, and/or an application, or the like. For example, the electronic device 101 and/or the processor 210 may perform at least one of the operations of FIG. 4, 6, 8, or 9 when a set of a plurality of instructions distributed in the form of the operating system, firmware, driver, and/or application is executed. Hereinafter, the application being installed in the electronic device 101 may refer, for example, to one or more instructions provided in the form of the application being stored in the memory 220 of the electronic device 101, and the one or more applications being stored in an executable format (e.g., a file with an extension specified by the operating system of the electronic device 101) by the processor 210 of the electronic device 101.

According to an embodiment, the sensor 230 of the electronic device 101 may generate electronic information that may be processed by the processor 210 and/or the memory 220 of the electronic device 101 from non-electronic information related to the electronic device 101. For example, the sensor 230 may include an inertia measurement unit (IMU) for detecting the physical motion of the electronic device 101. The IMU may include an acceleration sensor, a gyro sensor, a geomagnetic sensor, or a combination thereof. The acceleration sensor may output data indicating the direction and/or magnitude of gravitational acceleration applied to the acceleration sensor along a plurality of axes (e.g., x-axis, y-axis, and z-axis) perpendicular to each other. The gyro sensor may output data indicating rotation of each of the plurality of axes. The geomagnetic sensor may output data indicating a direction (e.g., a direction of the N pole or the S pole) of the magnetic field including the geomagnetic sensor. The IMU in the sensor 230 may be referred to as a motion sensor in terms of detecting motion of the electronic device 101. For example, the sensor 230 may include a proximity sensor and/or a grip sensor for identifying an external object in contact with the housing of the electronic device 101. The number and/or type of sensors 230 are not limited to those described above, and the sensor 230 may include an image sensor, an illumination sensor, a time-of-flight (ToF) sensor, and/or a global positioning system (GPS) sensor for detecting electromagnetic waves including light.

According to an embodiment, the camera 240 of the electronic device 101 may include one or more optical sensors (e.g., a charged coupled device (CCD) sensor, a complementary metal oxide semiconductor (CMOS) sensor) that generate an electrical signal indicating the color and/or brightness of light. A plurality of optical sensors in the camera 240 may be disposed in the form of a 2 dimensional array. The camera 240 may generate an image that corresponds to light reaching optical sensors of a 2 dimensional array and includes a plurality of pixels arranged in 2 dimensions, by obtaining the electrical signals of each of the plurality of optical sensors substantially simultaneously. For example, photo data captured using the camera 240 may refer, for example, to an image obtained from the camera 240. For example, video data captured using the camera 240 may refer, for example, to a sequence of a plurality of images obtained from the camera 240 according to a specified frame rate.

For example, the electronic device 101 may obtain spatial information 224 indicating the reality space where the electronic device 101 is located, using the camera 240. The electronic device 101 may obtain the spatial information, using a sensor (not illustrated) and an odometry (not illustrated). For example, the electronic device 101 may obtain the spatial information, using simultaneous localization and mapping (SLAM). The electronic device 101 may identify a portion of the reality space where the electronic device 101 is located, in the reality space, using the spatial information.

According to an embodiment, the projection assembly 250 of the electronic device 101 may include a plurality of hardware assembled to emit light representing pixels arranged in 2 dimensions. For example, the projection assembly 250 may include cathode-ray tubes (CRTs) for emitting light of each of the three primary colors in the color space, and a combination of lenses for magnifying the light emitted from each of the CRTs. For example, the projection assembly 250 may include a light source (e.g., a lamp) for emitting light, optical filters for dividing the light into light paths corresponding to each of the three primary colors, liquid crystal display (LCD) panels disposed in each of the light paths, and a combination of prisms and/or lenses for synthesizing light emitted from the LCD panels. For example, the projection assembly 250 may include the light source for emitting light, the optical filter for selecting one of three primary colors from the light, a digital mirror device (DMD) for controlling reflection of primary colors filtered by the optical filter, and the combination of lenses for magnifying the light reflected by the DMD. At least one of the illustrated combinations may be referred to as the projection assembly 250 in terms of requiring projection of light for display of a screen. In an embodiment, the electronic device 101 including the projection assembly 250 may be referred to as a beam projector.

The electronic device 101 according to an embodiment may move by controlling the actuator 260. For example, the actuator 260 may include at least one of at least one wheel, legs, continuous track, or propeller for moving the electronic device 101. The electronic device 101 may change the location of the electronic device 101, using the at least one, by controlling the actuator 260. The electronic device 101 may be divided into a wheel moving type, a legs moving type, a continuous track type, and/or a flying type, based on the at least one type. However, it is not limited thereto.

According to an embodiment, the communication circuit 270 of the electronic device 101 may include hardware for supporting transmission and/or reception of electrical signals between the electronic device 101 and an external electronic device 102. Although only the external electronic device 102 is illustrated as another electronic device connected through the communication circuit 270 of the electronic device 101, the embodiment is not limited thereto. The communication circuit 270 may include, for example, at least one of a modem (MODEM), an antenna, and an optic/electronic (O/E) converter. The communication circuit 270 may support transmission and/or reception of electrical signals based on various types of protocols, such as the ethernet, the local area network (LAN), the wide area network (WAN), the wireless fidelity (WiFi), the Bluetooth, the bluetooth low energy (BLE), the ZigBee, the long term evolution (LTE), and the 5G new radio (NR).

According to an embodiment, the electronic device 101 may receive media content information 221 (or information indicating the screen) using the communication circuit 270. For example, the electronic device 101 may wirelessly receive a signal for displaying media content included in the media content information 221, based on a wireless communication protocol such as wireless display (WiDi) and/or Miracast, through the communication circuit 270. For example, the electronic device 101 may receive a signal for displaying the media content by wire, based on a wired communication protocol (or a wired interface) such as high-definition multimedia interface (HDMI) and displayport (DP), mobile high-definition link (MHL), digital visual interface (DVI), and/or D-subminiature (D-sub), using the communication circuit 270. For example, the electronic device 101 may identify the location of the electronic device 101, within the reality space, based on the ultra-wide band (UWB), using the communication circuit 270. For example, the electronic device 101 may identify the location of the electronic device 101 based on identifying at least one sensor (not illustrated) disposed in the reality space, using a communication circuit 270. The at least one sensor may be disposed in at least a portion of the reality space. However, it is not limited thereto. For example, the electronic device 101 may identify the location of the electronic device 101, based on the time-of-flight (ToF) and/or the global positioning system (GPS).

The speaker 280 according to an embodiment may output an audio signal. For example, the electronic device 101 may receive audio data from an external device (e.g., a server, a smartphone, a PC, a PDA, or an access point). The electronic device 101 may output the received audio data using the speaker 280. For example, in case that the electronic device 101 fails to identify a flat surface for displaying the media content, the electronic device 101 may output audio data indicating that the media content is displayed, on another flat surface distinct from the flat surface. For example, the speaker 280 may receive the electrical signal. For example, the speaker 280 may convert the electrical signal into a sound wave signal. For example, the speaker 280 may output an audio signal including the converted sound wave signal.

The electronic device 101 according to an embodiment may receive the audio signal (e.g., a voice signal) using the microphone 290. For example, the electronic device 101 may include one or more microphones. For example, the electronic device 101 may receive the other audio signal for playing the media content from a user (e.g., a first user 105 of FIG. 1) using the microphone 290. The electronic device 101 may identify the media content information 221 indicating the media content in response to receiving the other audio signal. For example, the electronic device 101 may receive an audio signal for obtaining the media content from the user. The electronic device 101 may obtain the media content, by controlling the camera 240. The electronic device 101 may identify a sound signal that is greater than or equal to a specified threshold (e.g., decibel (dB)), using the microphone 290. Based on identifying the sound signal, the electronic device 101 may move to the location where the sound signal was generated, using the actuator 260. Based on identifying the electronic device 101 that moved to the location where the sound signal was generated, the electronic device 101 may obtain media content indicating an external object from which the sound signal was generated by controlling a camera.

For example, the electronic device 101 may identify the user based on receiving a voice signal from the user (e.g., the first user 105 of FIG. 1) received using the microphone 290. For example, the electronic device 101 may identify the user using user information 225. The electronic device 101 may perform a speaker recognition function based on the user information 225. The electronic device 101 may identify the user who has transmitted the voice signal based on performing the speaker recognition function. However, it is not limited thereto.

The electronic device 101 according to an embodiment may obtain the media content by controlling the camera, in response to receiving the voice signal for obtaining the media content from the user (e.g., the first user 105 of FIG. 1). The electronic device 101 may obtain the media content, in response to an input indicated by the voice signal. The input may include an input indicating obtaining a plurality of media content, and/or an input for measuring the size of an external object included in the media content. Based on obtaining the media content, the electronic device 101 may obtain the media content information 221 using external object information 222 or event information 223 included in the media content. The external object information 222 may include information indicating the user (e.g., the second user 106 of FIG. 1) matching the user information 225 or a portion of the space matching the spatial information 224. For example, the electronic device 101 may obtain the event information 223 corresponding to the media content, based on identifying a specified event independently of receiving the voice signal. The electronic device 101 may identify log information 226 using the spatial information 224 based on obtaining the media content information 221.

For example, the log information 226 may be distinguished based on a specified category. For example, the log information 226 may be distinguished based on the external object information 222. The log information 226 may be distinguished by a specified motion of an external object included in the external object information 222. The log information 226 may be distinguished based on the number of media contents. The log information 226 may be distinguished based on the spatial information 224. The log information 226 may be distinguished based on input indicated by the voice signal received from the user. The log information 226 may include time information when the media content was obtained. For example, the electronic device 101 may identify an input for playing the media content that matches the input for obtaining the media content, using the log information 226. The log information 226 may be distinguished based on the type of media content. The type of media content may be obtained by an input for obtaining the media content. For example, the input for obtaining the media content may include at least one of an input for obtaining the external object based on the specified motion, or an input for obtaining a size of the external object.

An operation in which the electronic device 101 stores the log information 226 based on the specified category will be described in greater detail below with reference to FIG. 10.

Referring to FIG. 2, the server 201 connected to the electronic device 101 may include at least one of a processor (e.g., including processing circuitry) 210-1, a memory 220-1, and/or a communication circuit 270-1. The processor 210-1, the memory 220-1, and the communication circuit 270-1 may be electronically and/or operably coupled with each other by a communication bus. In order to reduce repetition of description, among the descriptions of the processor 210-1, the memory 220-1, and the communication circuit 270-1, descriptions overlapping with the processor 210, the memory 220, and the communication circuit 270 not be repeated.

The electronic device 101 according to an embodiment may establish a communication link with the server 201 using the communication circuit 270. The electronic device 101 may transmit a signal indicating the log information 226 to the server 201 in a state of establishing a communication link with the server 201. The electronic device 101 may synchronize the log information 226-1 and the log information 226 stored in the server 201 based on transmitting the signal. For example, the electronic device 101 may synchronize with media content information 221-1, object information 222-1, and/or event information 223-1 stored in the memory 220-1 of the server 201, based on transmitting a signal indicating the media content information 221, the object information 222, and/or the event information 223-1. However, it is not limited thereto. For example, the electronic device 101 may receive information indicating media content to be displayed by controlling the projection assembly 250 from the server 201. The electronic device 101 may obtain the media content information 221, in response to a signal indicating the media content information 221-1 stored in the memory 220-1 of the server 201.

For example, the electronic device 101 may identify the log information 226 indicated by the voice signal obtained using the microphone 290. The electronic device 101 may transmit a signal requesting the media content to the server 201 in order to obtain the media content corresponding to the log information 226. In response to the signal, the server 201 may transmit another signal indicating the media content information 221-1 to the electronic device 101. For example, the electronic device 101 may transmit the media content information 221 among the media content information 221 and/or the log information 226 related to media content obtained using the camera 240 to the server 201. The electronic device 101 may efficiently manage the capacity of the memory 220 based on transmitting the media content information 221 to the server 201.

As described above, the electronic device 101 according to an embodiment may identify the log information 226 matching media content information 221 in response to an input indicating that media content is being played. Based on identifying the log information 226, the electronic device 101 may identify the external object information 222 included in the media content and/or information on the location where the media content was obtained. The electronic device 101 may identify media content to be displayed, in response to the input, by distinguishing the log information 226 that matches the media content information 221 based on the specified category.

Figure 3:
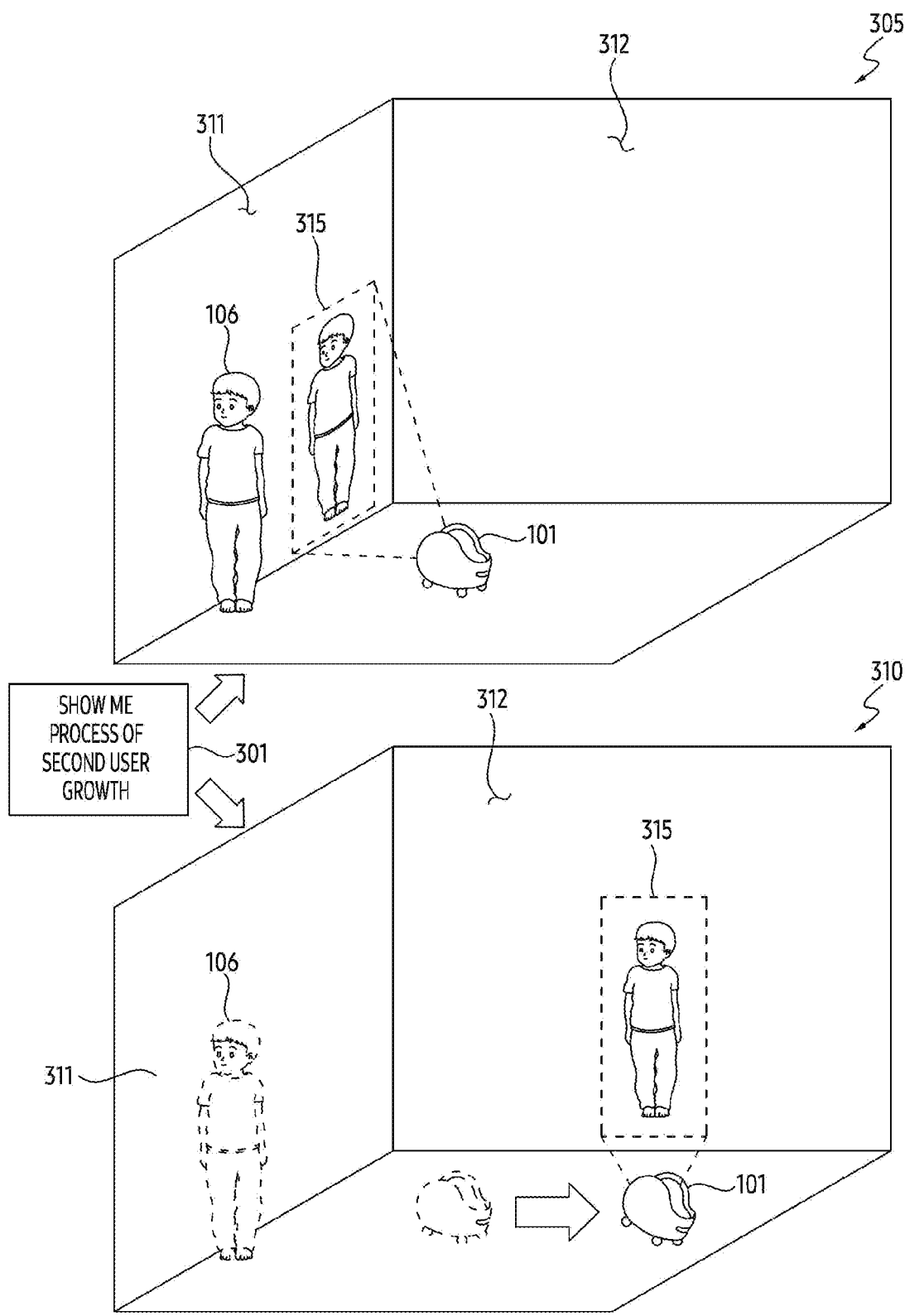
FIG. 3 is a diagram illustrating an example of an operation in which an electronic device displays media content based on a user's location, according to an embodiment.

FIG. 3 is a diagram illustrating an example of an operation in which an electronic device displays media content based on a user's location, according to an embodiment. An electronic device 101 of FIG. 3 may include the electronic device 101 of FIGS. 1 and 2. Referring to FIG. 3, states 305 and 310 receiving a voice signal 301 indicating playing the media content 315 are illustrated.

Referring to FIG. 3, in the states 305 and 310, the electronic device 101 according to an embodiment may receive the voice signal 301 from a user (e.g., a first user 105 of FIG. 1) using a microphone. The electronic device 101 may identify the media content 315 indicated by the voice signal 301 based on receiving the voice signal 301. For example, based on receiving the voice signal 301, the electronic device 101 may identify the external object (e.g., "second user") indicated by the voice signal 301 and/or the type (e.g., "Show me the process of growth") of the media content 315. The electronic device 101 may distinguish the type of the media content 315 using the number of media contents, whether the size of the external object is measured, and/or the state of the external object based on the specified motion. The type of the media content 315 may be distinguished based on another voice signal for the electronic device 101 to obtain media content 315. The type of the media content 315 may be included in log information 226 of FIG. 2. The type of the media content 315 displayed by the electronic device 101 according to an embodiment may be different based on the type of log information, which will be described in greater detail below with reference to FIG. 9.

For example, the electronic device 101 may identify the log information 226 of FIG. 2 based on identifying the voice signal 301. For example, the log information 226 may include information indicating at least one of an external object included in the media content and/or a location where the media content was obtained. The electronic device 101 may identify the media content information 221 of FIG. 2 based on identifying the log information 226. The electronic device 101 may obtain information indicating a second user 106 included in the media content based on identifying the media content information 221. The electronic device 101 may identify the location where the media content was obtained, using spatial information 224 of FIG. 2.

Referring to FIG. 3, in state 305, the electronic device 101 according to an embodiment may initiate driving a camera to identify the external object included in the media content 315, in response to the voice signal 301. For example, the electronic device 101 may identify the second user 106 located in at least a portion of the space using the camera. The electronic device 101 may identify whether the external object included in the media content 315 matches the second user 106 using the user information 225 of FIG. 2. In case that the external object matches the second user 106, the electronic device 101 may project the media content 315 by controlling the projection assembly toward a direction adjacent to the second user 106. Although not illustrated, the electronic device 101 according to an embodiment may display information indicating the size (e.g., height) of the external object included in the media content 315, based on the type of the media content 315, by controlling the projection assembly on the flat surface 311.

For example, the electronic device 101 may search for the second user 106 that matches the external object included in the media content 315, using the spatial information 224 of FIG. 2. The electronic device 101 may initiate driving the camera (e.g., a camera 240 of FIG. 2), in response to receiving the voice signal 301. The electronic device 101 may change a direction of the camera, using the actuator 260 of FIG. 2, in order to search for the second user 106. Within at least a portion of the space where the electronic device 101 is located, the electronic device 101 may rotate using the actuator. Based on rotating using the actuator, the electronic device 101 may identify the second user 106 located in at least a portion of the space, by changing the direction of the camera. However, it is not limited thereto.

For example, the electronic device 101 may identify the space where the second user 106 is located, using the external object information 222 included in the media content information 221 of FIG. 2. The space in which the second user 106 is located may refer, for example, to a space in which the electronic device 101 lastly identifies the second user 106. The space in which the second user 106 was lastly identified may be obtained based on time information identified by the electronic device 101 using log information (e.g., the log information 226 of FIG. 2) corresponding to the second user 106. The time information may include a time adjacent to the time when the electronic device 101 received the voice signal 301. For example, the electronic device 101 may identify the space where the second user 106 is located, using the spatial information (e.g., the spatial information 224 of FIG. 2) and/or the user information (e.g., the user information 225 of FIG. 2).

Referring to FIG. 3, the electronic device 101 according to an embodiment may initiate driving the camera to identify the second user 106, in response to the voice signal 301 in the state 310. In case that the electronic device 101 fails to identify the second user 106, the electronic device 101 may identify at least a portion of the space where the media content 315 was obtained, using the log information corresponding to the media content 315. For example, the log information may include information indicating the location and/or angle at which the electronic device 101 obtained the media content 315.

The electronic device 101 according to an embodiment may move to at least a portion of the space, by controlling the actuator, based on identifying at least a portion of the space. Based on moving to at least a portion of the space, the electronic device may display the media content 315 on the flat surface 312, by controlling the projection assembly. For example, the flat surface 312 may include at least one of the flat surfaces included in at least a portion of the space where the media content 315 is obtained. For example, the flat surface 312 on which the electronic device 101 projects the media content 315 in the state 310 may refer, for example, to a flat surface in which the electronic device 101 obtained the media content 315 using the camera before receiving the voice signal 301.

For example, in case that the electronic device 101 identifies another external object (e.g., obstacle) adjacent to the flat surface 312, although not illustrated, the electronic device 101 may display the media content 315 on another flat surface that is distinct from the flat surface 312. In case that the electronic device 101 identifies the other external object, the electronic device 101, the electronic device 101 may output an audio signal (e.g., "Project media content 315 to another location because it is not a valid location.") indicating that the media content 315 is displayed on another flat surface, using a speaker (e.g., a speaker 280 of FIG. 2), to the user (e.g., the first user 105 of FIG. 1) who has transmitted the voice signal 301. The electronic device 101 may obtain the user's gaze information, using the camera, in order to display the media content 315 on another flat surface. Based on obtaining the user's gaze information, the electronic device 101 may output light representing the media content 315 toward the direction of the user's gaze based on the user's gaze information. However, it is not limited thereto.

As described above, the electronic device 101 according to an embodiment may identify the flat surfaces 311 and 312 for displaying the media content 315 in response to the voice signal 301 indicating that the media content 315 is played. For example, the electronic device 101 may identify at least one of the flat surfaces 311 and 312 on which the media content 315 is to be displayed using the media content information 221, the log information 226, and/or the spatial information 224 of FIG. 2 corresponding to the media content 315. For example, the electronic device 101 may project light representing media content toward the external object, in a state in which the external object (second user 106) corresponding to the media content 315 is identified using the camera 305. The electronic device 101 may project light representing the media content 315 by moving to a space where the media content 315 is obtained, in a state 310 of not being able to identify the external object. The electronic device 101 may adjust the location (e.g., the flat surfaces 311 and 312) at which the media content 315 will be displayed, depending on whether the external object (e.g., the second user 106) is identified. Based on adjusting the location, the electronic device 101 may enhance the user experience related to the media content 315.

Figure 4:
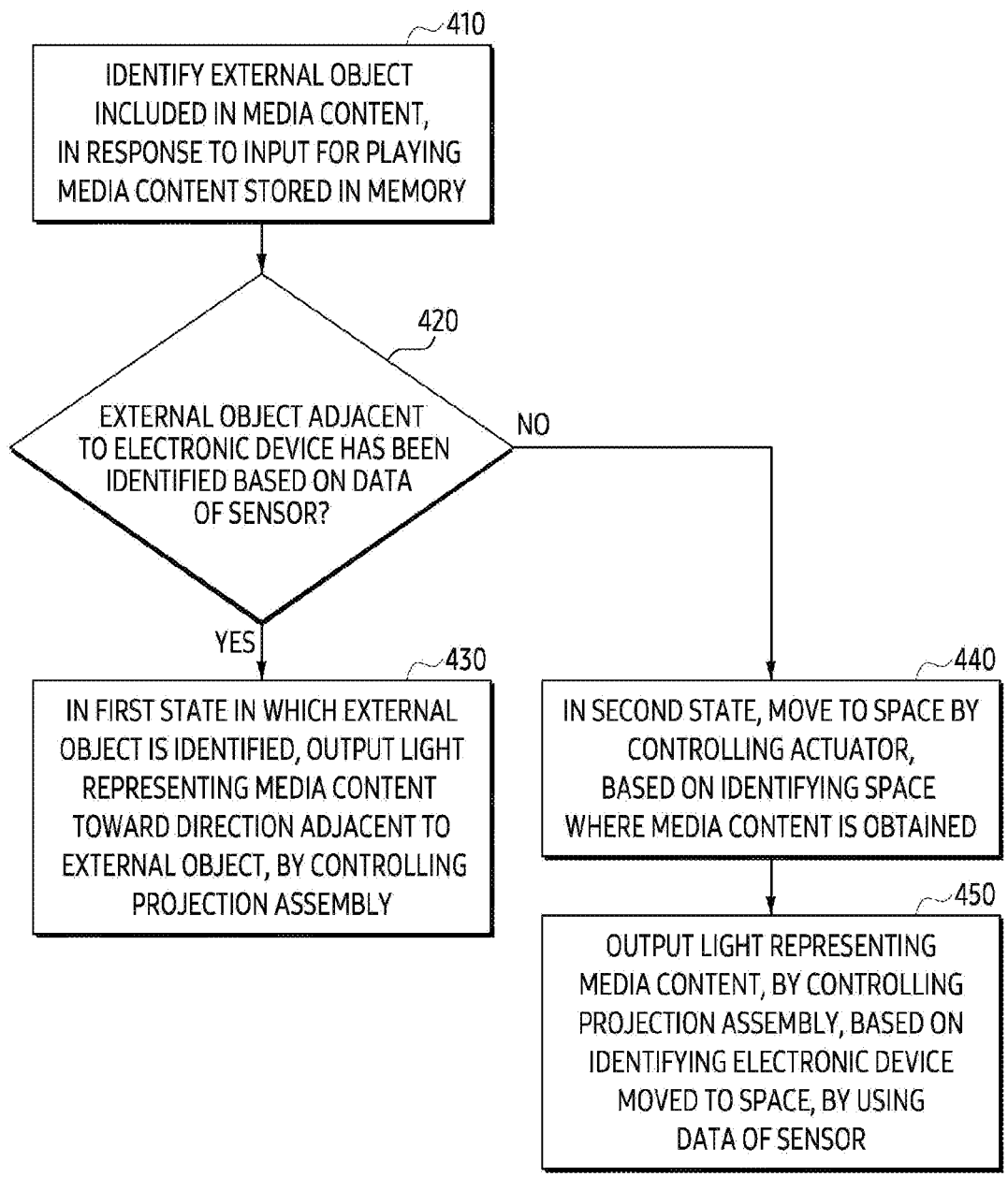
FIG. 4 is a flowchart illustrating an example operation of an electronic device according to an embodiment.

FIG. 4 is a flowchart illustrating an example operation of an electronic device according to an embodiment. An electronic device 101 of FIG. 4 may include the electronic device 101 of FIGS. 1 to 3. At least one of the operations of FIG. 4 may be performed by the electronic device 101 of FIG. 2 and/or a processor (e.g., one or more of at least one processor) 210 of FIG. 2. Each of the operations of FIG. 4 may be performed sequentially, but is not necessarily performed sequentially. For example, the order of each of the operations may be changed, and at least two operations may be performed in parallel.

Referring to FIG. 4, in operation 410, an electronic device according to an embodiment may identify an external object included in the media content, in response to an input for playing the media content stored in the memory. The input may include a voice signal 301 of FIG. 3. The external object included in the media content may include a user (e.g., a second user 106 of FIG. 1) indicated by the user information 225 of FIG. 2, and/or at least a portion (e.g., a kitchen, a bedroom, and/or a living room) of the space indicated by the spatial information 224.

Referring to FIG. 4, in operation 420, the electronic device according to an embodiment may identify whether an external object adjacent to the electronic device has been identified based on data of a sensor. For example, the electronic device may initiate driving the camera to search for the external object in the space where the electronic device is located. The electronic device may search for the external object using the camera, by changing a direction of the camera using an actuator.

Referring to FIG. 4, in the first state (operation 420—Yes) in which the external object is identified, in operation 430, the electronic device according to an embodiment may output light representing the media content toward a direction adjacent to the external object, by controlling the projection assembly. The first state may be included in state 305 of FIG. 3. The electronic device may display the light representing the media content 315 on a flat surface (e.g., a flat surface 311 of FIG. 3) adjacent to the external object, by controlling the projection assembly.

Referring to FIG. 4, in the second state (operation 430-No) in which the external object is not identified, in operation 440, the electronic device according to an embodiment may move to the space by controlling the actuator, based on identifying the space where the media content is obtained. For example, the electronic device may identify the space where the media content was obtained, using log information 226. The electronic device may move to the space, by controlling the actuator, using space information 224 of FIG. 2. The second state may be referred to state 310 of FIG. 3.

Referring to FIG. 4, in operation 450, the electronic device according to an embodiment may output the light representing the media content, by controlling the projection assembly, based on identifying the electronic device moved to the space, using the data of the sensor.

Figure 5:
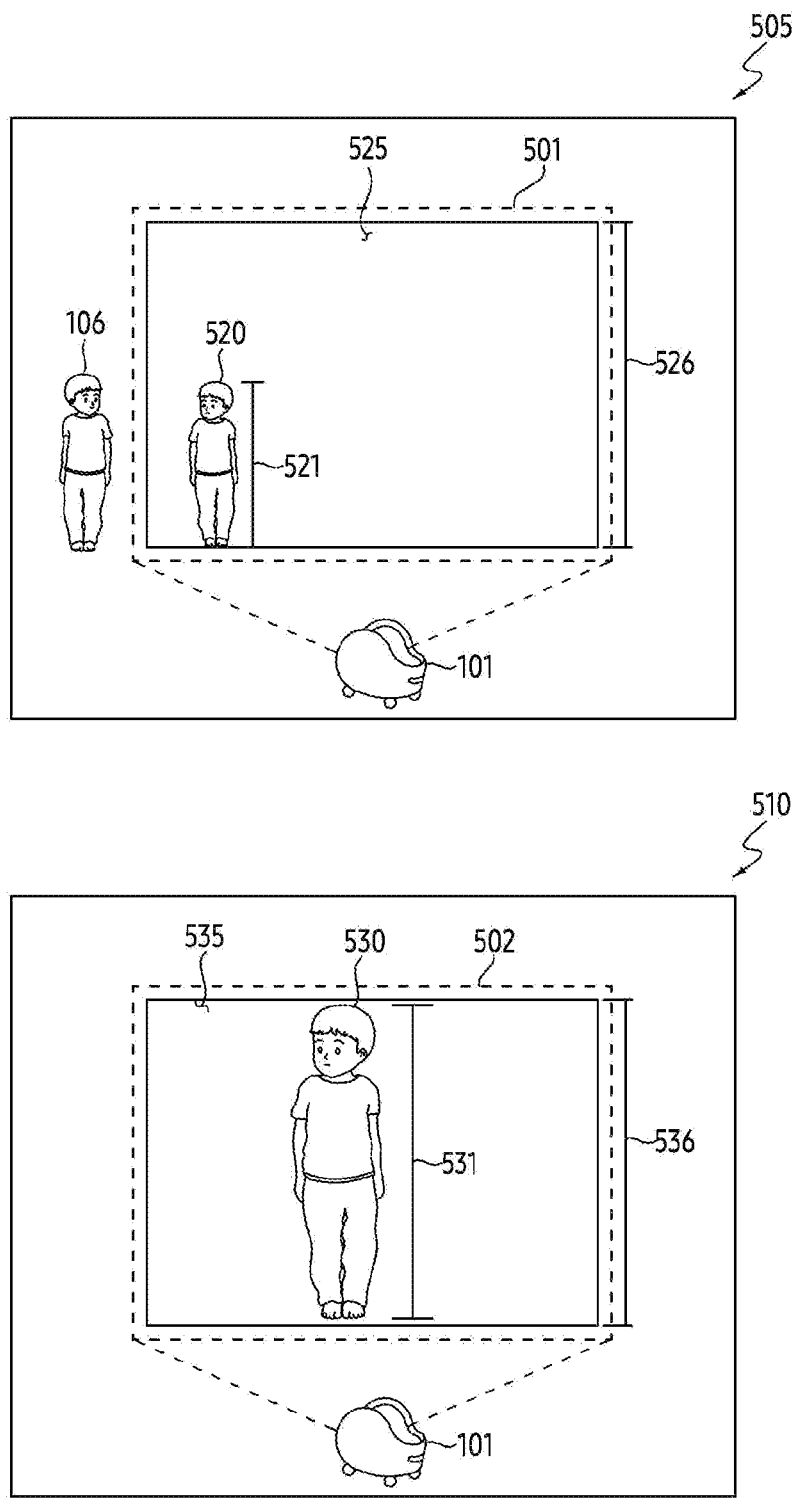
FIG. 5 is a diagram illustrating an example of an operation of displaying media content based on the size of an external object of an electronic device according to an embodiment.

FIG. 5 is a diagram illustrating an example of an operation of displaying media content based on the size of an external object of an electronic device according to an embodiment. An electronic device 101 of FIG. 5 may include the electronic device 101 of FIGS. 1 to 4. Referring to FIG. 5, states 505 and 510 for displaying media content based on a size of an external object are illustrated.

Referring to FIG. 5, in state 501, the electronic device 101 according to an embodiment may display a media content 501, by controlling a projection assembly, on a flat surface (e.g., a flat surface 311 of FIG. 3) adjacent to a second user 106. The media content 501 may include a screen 525 and/or an external object 520 corresponding to the second user 106. The electronic device 101 may identify a size 521 of the external object 520, based on log information (e.g., log information 226 of FIG. 2) corresponding to the media content 501. For example, the log information may be obtained, based on receiving a voice signal indicating that the electronic device 101 measures the size 521 of the external object 520 from a user (e.g., a first user 105 of FIG. 1) of the electronic device 101. The operation of measuring the size 521 by the electronic device 101 will be described in greater detail below with reference to FIG. 10.

For example, the electronic device 101 may adjust the size of the media content 501 based on identifying the size 521 of the external object 520. However, it is not limited thereto. For example, the electronic device 101 may output light representing the media content 501, based on the size of the flat surface adjacent to the second user 106.

For example, the electronic device 101 may identify the size of the media content 501, using a distance between the electronic device 101 and the flat surface on which the media content 501 is to be projected, and/or a projection angle (e.g., an angle at which the electronic device 101 projects the media content 501). The size of the media content 501 may be referenced to a size 526 of the screen 525. For example, the size of the media content 501 may include a height of the screen 525. The electronic device 101 may identify the size of the media content 501 using Equation 1 below.

$$h = 2d * \tan\frac{a}{2} \qquad [\text{Equation 1}]$$

Referring to Equation 1, h may refer, for example, to the size (e.g., height) of the media content 501. d may refer, for example, to the distance between the electronic device 101 and the flat surface on which the media content 501 is to be projected. a may refer, for example, to the projection angle. For example, the electronic device 101 may display the external object 520 by overlapping it on the screen 525 in order to improve the visibility of the external object 520 to the user (e.g., the first user 105 of FIG. 1). The electronic device 101 may change the color (e.g., black) of the screen 525 using the color information of the external object 520. However, it is not limited thereto.

For example, the electronic device 101 may adjust the size of the external object 520 obtained by the log information corresponding to the media content 501, based on identifying the size of the media content 501. For example, the electronic device 101 may adjust the size 521 of the external object 520, using the log information, in proportion to the size of the media content 501.

The electronic device 101 according to an embodiment may display the external object 520 on the flat surface adjacent to the second user 106, by overlapping on the screen 525 and controlling the projection assembly, based on adjusting the size 521 of the external object 520. Although not illustrated, the electronic device 101 may display a numerical value (e.g., 122 cm) indicating the size 521 along with the external object 520 on the flat surface, based on the adjusted size 521 of the external object 520.

The electronic device 101 according to an embodiment may adjust the location at which the external object 520 is displayed on the screen 525. For example, based on identifying the location of the second user 106 using the camera, the electronic device 101 may display the external object 520 in an area adjacent to the second user 106 of the screen 525. The electronic device 101 may adjust the location of the external object 520 so that the second user 106 and the external object 520 are included within the field-of-view (FoV) of the user (e.g., the first user 105 of FIG. 1).

Referring to FIG. 5, the electronic device 101 according to an embodiment, in state 510, may output a media content 502 including an external object 530 based on a size 531 that matches the size 536 of the screen 535, by controlling the projection assembly. The electronic device 101 may identify the size 531 of the external object 530, using the log information corresponding to the media content 502. The electronic device 101 may adjust the size 531 of the external object 530 using the size 536 of the screen 535, based on identifying the size 531 that is greater than or equal to a specified threshold. The electronic device 101 may move by controlling an actuator, in order to project the media content 502, based on the size 531 of the external object 530 obtained using the log information. The electronic device 101 may adjust a distance between the electronic device 101 and the flat surface on which the media content 502 is to be displayed, by moving by controlling the actuator.

For example, in order to adjust the size of the media content 502, the electronic device 101 may adjust the projection angle for projecting the media content 502, using the projection assembly. For example, the electronic device 101 may adjust the projection angle using Equation 2 below.

$$a = 2 * \tan^{-1}\frac{h}{2d} \qquad [\text{Equation 2}]$$

Referring to Equation 2, a may refer, for example, to the projection angle. h may refer, for example, to the size of the media content 502. d may refer, for example, to a distance between the electronic device 101 and a flat surface on which the media content 502 is projected. For example, the electronic device 101 may adjust the distance between the electronic device 101 and the flat surface, in order to adjust the media content 502, using Equation 2. However, it is not limited thereto.

As described above, the electronic device 101 according to an embodiment may identify the size of the external object included in the media content, using the log information corresponding to the media content (e.g., at least one of the media contents 501 and 502). The electronic device 101 may adjust the size of media content, based on the size of the external object. The electronic device 101 may adjust the angle (e.g., the projection angle) at which the media content is to be projected, and/or the distance between the electronic device 101 and the flat surface on which the media content is to be projected, in order to adjust the size of the media content. The electronic device 101 may project the external object onto the flat surface, based on the adjusted size of the media content. The electronic device 101 may provide the user with the external object displayed based on the size of the external object. The electronic device 101 may provide the user with a service that may compare the size of the external object and the size of the user, by displaying the external object toward a direction adjacent to the user (e.g., the second user 106) corresponding to the external object.

Figure 6:
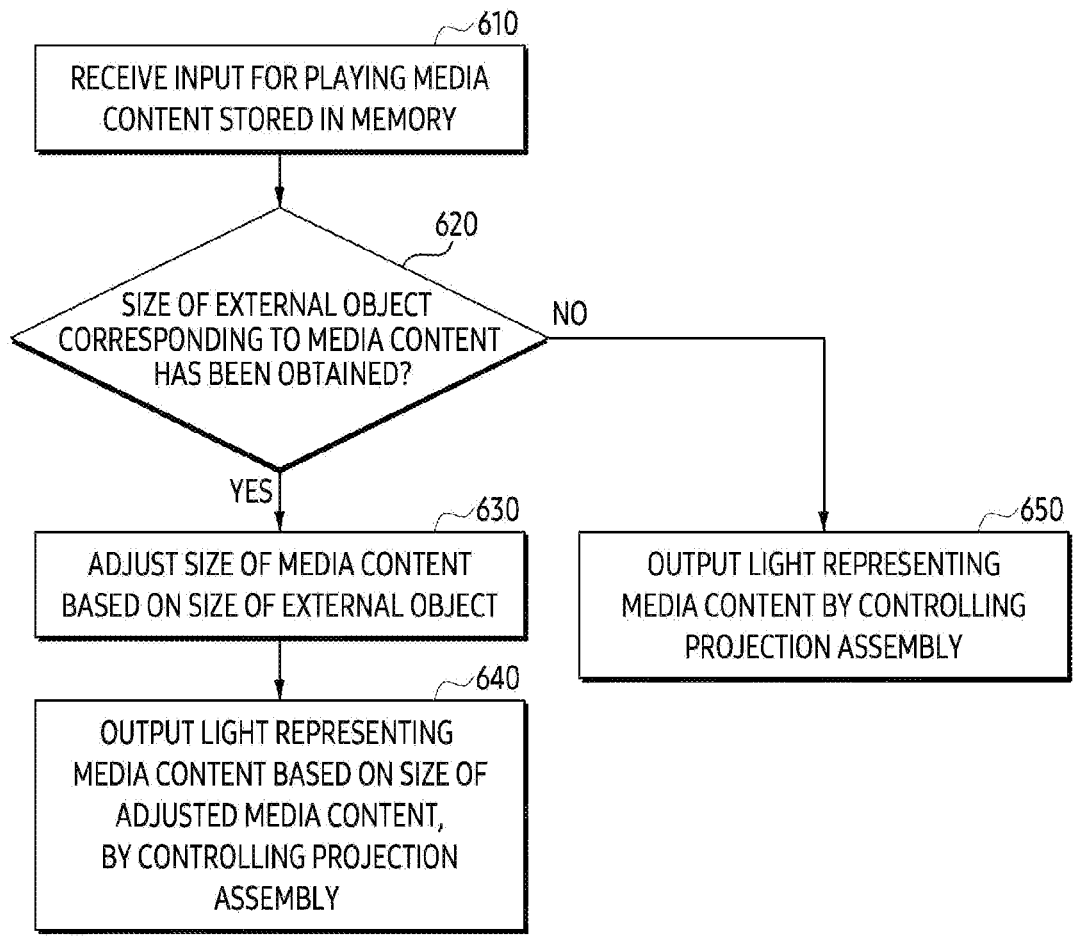
FIG. 6 is a flowchart illustrating an example operation of an electronic device according to an embodiment.

FIG. 6 is a flowchart illustrating an example operation of an electronic device according to an embodiment. An electronic device 101 of FIG. 6 may include the electronic device 101 of FIGS. 1 to 5. At least one of the operations of FIG. 6 may be performed by the electronic device 101 of FIG. 2 and/or a processor 210 of FIG. 2. Each of the operations of FIG. 6 may be performed sequentially, but is not necessarily performed sequentially. For example, the order of each of the operations may be changed, and at least two operations may be performed in parallel. At least one of the operations of FIG. 6 may be related to at least one of the operations of FIG. 4.

Referring to FIG. 6, an electronic device according to an embodiment may receive an input for playing a media content stored in a memory in operation 610. The operation performed by the electronic device in operation 610 may be referred to the operation performed in operation 410 of FIG. 4.

Referring to FIG. 6, in operation 620, an electronic device according to an embodiment may identify whether a size of an external object corresponding to the media content has been obtained. The electronic device may identify log information (e.g., log information 226 in FIG. 2) corresponding to media content (e.g., at least one of media contents 501 and 502 of FIG. 5). An electronic device may identify the size of the external object using the log information. For example, in response to an input for obtaining the media content, the electronic device may store the size of the external object in memory using the log information.

Referring to FIG. 6, in case that the size of the external object is identified (operation 620—Yes), the electronic device according to an embodiment may adjust the size of the media content based on the size of the external object in operation 630. For example, the electronic device may adjust the size of the media content, using a distance between a flat surface to display the media content and the electronic device, and/or an angle to project the media content using the projection assembly.

Referring to FIG. 6, in operation 640, the electronic device according to an embodiment may output light representing the media content based on the size of the adjusted media content, by controlling the projection assembly. The electronic device may display by controlling the projection assembly, by overlapping a value representing the size of the external object on the media content. The state in which the electronic device outputs the light representing the media content may be referred to at least one of the state 505 of FIG. 5 or the state 510 of FIG. 5. For example, the electronic device may search for a user (e.g., a second user 106 of FIG. 3) corresponding to the external object using a camera, in order to output media content.

Referring to FIG. 6, in case that the size of the external object is not identified (operation 620—No), in operation 650, the electronic device according to an embodiment may output the light representing the media content by controlling the projection assembly. The state in which the electronic device outputs the light representing the media content may be referred to at least one of the state 305 of FIG. 3 or the state 310 of FIG. 3.

Figure 7:
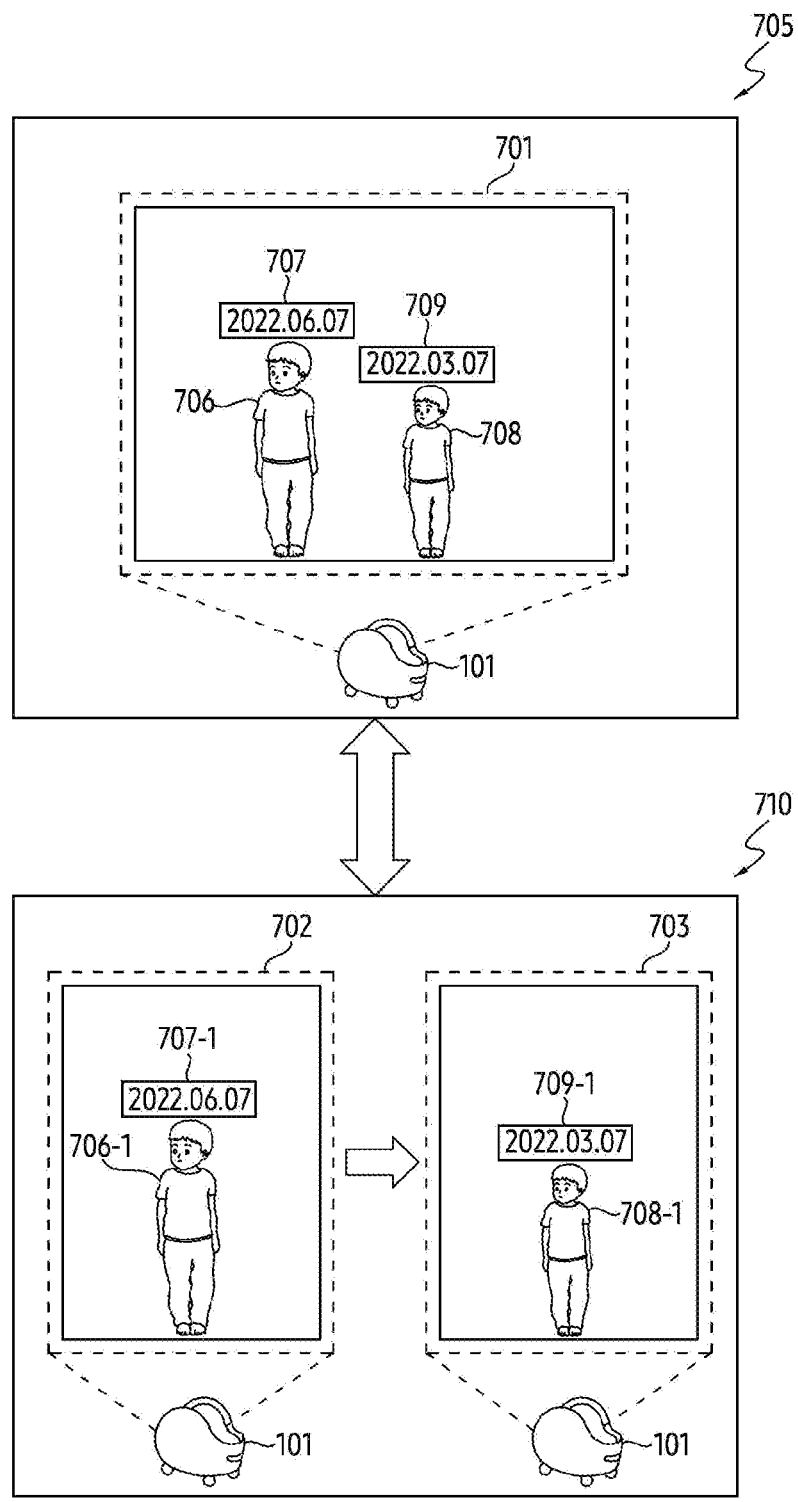
FIG. 7 is a diagram illustrating an example of an operation in which an electronic device displays a plurality of media contents according to an embodiment.

FIG. 7 is a diagram illustrating an example of an operation in which an electronic device displays a plurality of media contents according to an embodiment. An electronic device 101 of FIG. 7 may include the electronic device 101 of FIGS. 1 to 6. Referring to FIG. 7, states 705 and 710 for displaying media content including one or more external objects are illustrated.

Referring to FIG. 7, in state 705, the electronic device 101 according to an embodiment may display media content 701 including one or more external objects 706 and 708 on a flat surface, by controlling the projection assembly. Each of the one or more external objects 706 and 708 may be obtained using media content obtained by electronic device 101 at different times. An operation in which the electronic device 101 obtains each of the one or more external objects will be described in greater detail below with reference to FIG. 10.

For example, the electronic device 101 may output the media content 701 including the one or more external objects 706 and 708, in response to an input (e.g., a voice signal) for playing each of the one or more external objects 706 and 708. A user (e.g., a second user 106 of FIG. 1) corresponding to each of the one or more external objects 706 and 708 may be the same. The electronic device 101 may identify the one or more external objects 706 and 708, using user information 225 of FIG. 2 and/or log information corresponding to each of the one or more external objects 706 and 708.

For example, the electronic device 101 may receive an input for outputting media content corresponding to the second user 106. The electronic device 101 may obtain media content information 221 corresponding to the second user 106, based on identifying external object information 222 of FIG. 2 for the second user 106. Based on obtaining the media content information 221, the electronic device 101 may identify the one or more external objects 706 and 708.

For example, the electronic device 101 may identify the one or more external objects 706 and 708, based on identifying log information 226 corresponding to the second user 106. For example, the electronic device 101 may identify the one or more external objects 706 and 708, in response to an input for playing media content in which a size of the second user 106 is measured. The log information corresponding to the one or more external objects 706 and 708 may include the size of the second user 106.

For example, the electronic device 101 may identify log information corresponding to each of the one or more external objects 706 and 708. Each of the one or more external objects 706 and 708 may be obtained based on the different times. The electronic device 101 may store log information including time information at which each of the one or more external objects 706 and 708 was obtained, in the memory.

The electronic device 101 according to an embodiment may identify a size of a flat surface for displaying the media content 701, using a camera. In case that the electronic device identifies the flat surface based on a size that is greater than or equal to a specified threshold, the electronic device may display the media content 701 including all of the one or more external objects 706 and 708 on the flat surface. For example, the electronic device 101 may adjust the size of the media content 701, based on the size of each of the one or more external objects 706 and 708. The specified threshold may be set depending on whether the media content including all of the one or more external objects 706 and 708 may be displayed.

For example, the electronic device 101 may display the operation of displaying the media content 701 including the one or more external objects 706 and 708, and the time (e.g., time information 707 and 709) at which each of the one or more external objects 706 and 708 was obtained, on the flat surface, by overlapping the media content 701. The time information 707 may indicate the time at which the media content including an external object 706 was obtained. The time information 709 may indicate the time at which the media content including the external object 708 was obtained. The electronic device 101 may display the media content 701 including the one or more external objects 706 and 708 and the time information 707 and 709 corresponding to each of the one or more external objects, on the flat surface. By displaying the media content 701, the electronic device 101 may provide a user (e.g., a user 105 of FIG. 1) with a size change of the second user 106 corresponding to each of the one or more external objects 706 and 708 over time. For example, although not illustrated, the electronic device 101 may obtain media content including an external object (e.g., a plant). Based on obtaining the media content including the external object, the electronic device 101 may obtain log information including the size and/or number of leaves of the external object.

In state 710, the electronic device 101 according to an embodiment may display each of the media contents 702 and 703 including each of the one or more external objects 706-1 and 708-1, on the flat surface based on a specified time period, based on identifying the size of the flat surface (e.g., the flat surface on which media content will be projected) that is less than or equal to a specified threshold. For example, the electronic device 101 may set the specified time.

For example, based on time information 707-1 and 709-1 in which each of the one or more external objects 706-1 and 708-1 is obtained, the electronic device 101 may obtain an order for displaying each of the media contents 702 and 703. For example, based on displaying the media content 702, the electronic device 101 may replace the media content 702 and display the media content 703 after the specified time. The electronic device 101 may provide a video including the media contents 702 and 703 to the user, based on the order. However, it is not limited thereto.

As described above, the electronic device 101 according to an embodiment may obtain a plurality of media contents, at the different times, in response to an input for obtaining the plurality of media contents. Each of the plurality of media contents may include at least one external object. The electronic device 101 may store log information corresponding to each of the plurality of media contents in a memory.

For example, the electronic device 101 may identify the log information, in response to an input indicating displaying all of the plurality of media contents. Based on identifying the log information, the electronic device 101 may identify the size of the flat surface for projecting all of the plurality of media contents, using the camera. By displaying the plurality of media contents based on the size of the flat surface, the electronic device 101 may provide the user with changes of the state (e.g., size, magnitude, number of leaves, and/or body weight) of the at least one external object over time.

Figure 8:
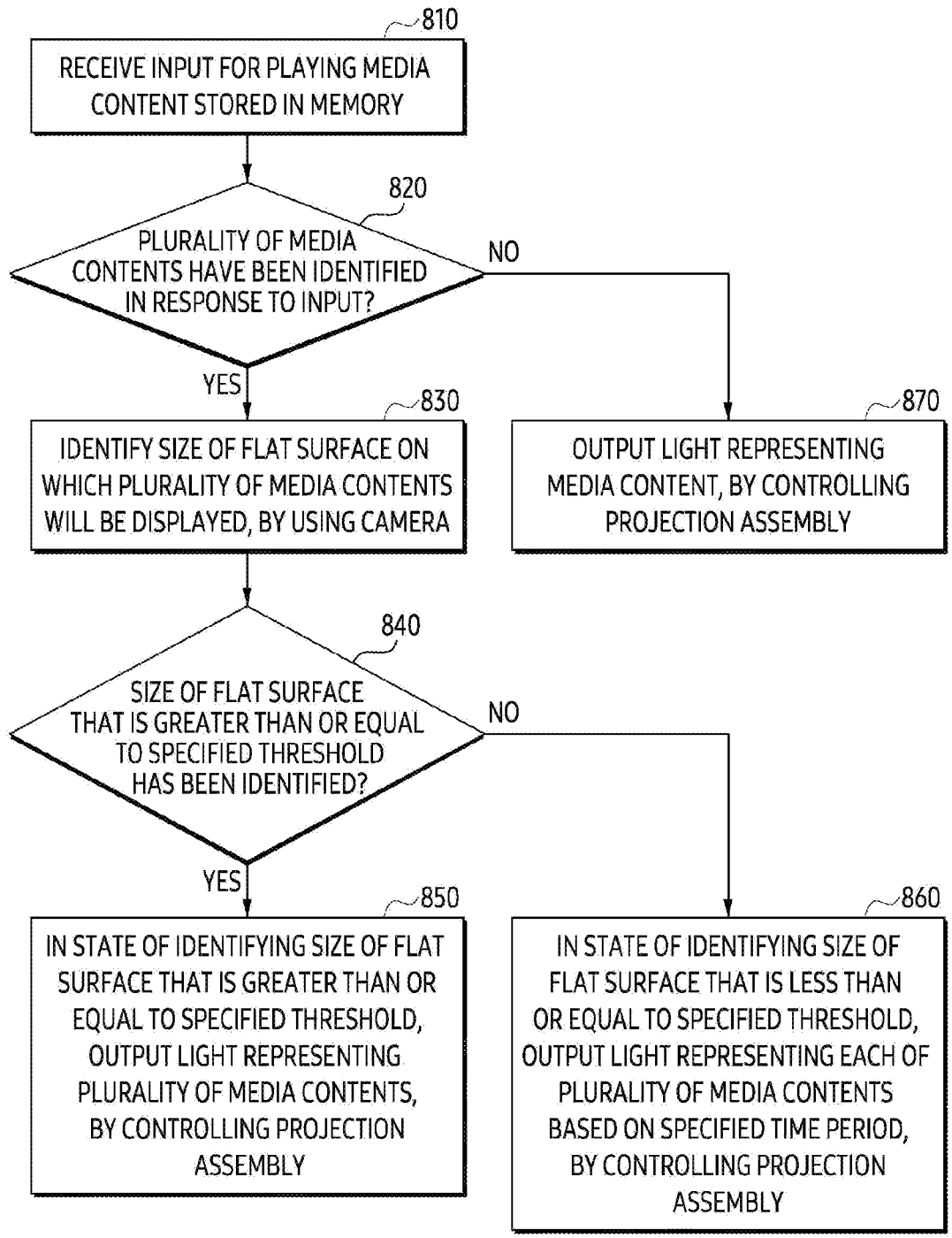
FIG. 8 is a flowchart illustrating an example operation of an electronic device according to an embodiment.

FIG. 8 is a flowchart illustrating an example operation of an electronic device according to an embodiment. An electronic device 101 of FIG. 8 may include the electronic device 101 of FIGS. 1 to 7. At least one of the operations in FIG. 8 may be performed by the electronic device 101 in FIG. 2 and/or a processor 210 in FIG. 2. Each of the operations in FIG. 8 may be performed sequentially, but is not necessarily performed sequentially. For example, the order of each of the operations may be changed, and at least two operations may be performed in parallel. At least one of the operations of FIG. 8 may be related to at least one of the operations of FIG. 4.

Referring to FIG. 8, in operation 810, the electronic device according to an embodiment may receive an input for playing media content stored in a memory. The operation performed by the electronic device in operation 810 may be substantially similar to the operation performed in operation 410 of FIG. 4. For example, the input for playing the media content may be obtained from a user 105 of FIG. 1 based on a voice signal.

Referring to FIG. 8, in operation 820, an electronic device according to an embodiment may check whether a plurality of media contents have been identified in response to an input. For example, each of the plurality of media content may include one external object. The electronic device may store log information corresponding to each of the plurality of media contents obtained based on different times in the memory. The log information may include time information corresponding to each of the plurality of media contents, information on the one external object (e.g., a second user 106 of FIG. 1), spatial information in which each of the plurality of media contents is obtained, and/or a size of the one external object. In case that the electronic device according to an embodiment fails to identify the plurality of media contents (operation 820—No), in operation 870, the electronic device may display light representing one media content corresponding to the input received in operation 810, by controlling the projection assembly.

Referring to FIG. 8, in case that the electronic device according to an embodiment identifies the plurality of media contents (operation 820—Yes), in operation 830, the electronic device may identify the size of the flat surface on which the plurality of media contents will be displayed, using the camera. In operation 840, the electronic device according to an embodiment may check whether a size of a flat surface that is greater than or equal to a specified threshold has been identified. The electronic device may identify the size of the flat surface based on whether all of the plurality of media contents may be displayed.

Referring to FIG. 8, in operation 850, in a state of identifying the size of the flat surface that is greater than or equal to the specified threshold (operation 840—Yes), the electronic device according to an embodiment may output light representing the plurality of media contents, by controlling the projection assembly. The state in which the electronic device outputs light representing the plurality of media contents may be referred to state 705 of FIG. 7.

Referring to FIG. 8, in operation 860, in a state of identifying the size of the flat surface that is less than or equal to the specified threshold (operation 840—No), the electronic device according to an embodiment may output light representing each of the plurality of media contents based on a specified time period, by controlling the projection assembly. The state in which the electronic device outputs the light representing each of the plurality of media contents may be referred to state 710 of FIG. 7.

Figure 9:
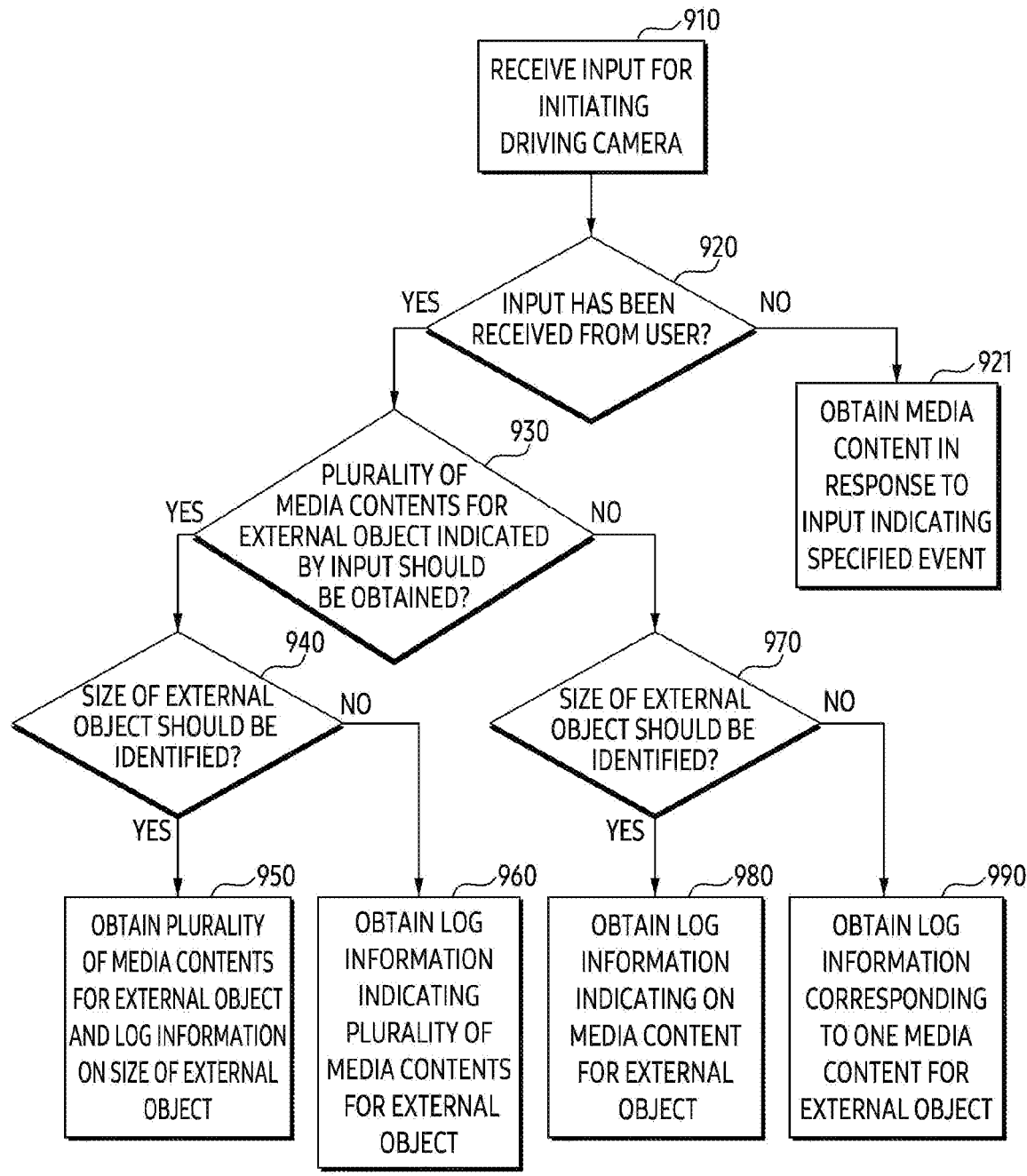
FIG. 9 is a flowchart illustrating an example operation in which an electronic device obtains media content according to an embodiment.

FIG. 9 is a flowchart illustrating an example operation in which an electronic device obtains media content according to an embodiment. An electronic device 101 of FIG. 9 may include the electronic device 101 of FIGS. 1 to 8. At least one of the operations in FIG. 9 may be performed by the electronic device 101 in FIG. 2 and/or a processor 210 in FIG. 2. Each of the operations in FIG. 9 may be performed sequentially, but is not necessarily performed sequentially. For example, the order of each of the operations may be changed, and at least two operations may be performed in parallel.

Referring to FIG. 9, the electronic device according to an embodiment may receive an input for initiating driving the camera in operation 910. The input may refer, for example, to a voice signal of a user (e.g., a first user 105 of FIG. 1) for generating at least one media content. The input may refer, for example, to an audio signal greater than or equal to a specified threshold. However, it is not limited thereto.

Referring to FIG. 9, the electronic device according to an embodiment may identify whether the input has been received from the user in operation 920. In case that the electronic device according to an embodiment fails to receive an input from the user (operation 920—No), the electronic device may obtain media content in response to an input indicating the specified event. The specified event may be identified based on the electronic device receiving a sound signal (e.g., noise) greater than or equal to a specified threshold using a microphone. The specified event may include identifying a change of an external object in a space using spatial information 224 of FIG. 2 and/or external object information 222 of FIG. 2. For example, the electronic device may obtain log information corresponding to the media content. The log information may be classified according to the type of the media content and/or the specified event. For example, in case of obtaining the media content based on receiving an audio signal that is greater than or equal to the specified threshold, the log information may be classified based on a first type (e.g., "event-sound"). For example, in case of obtaining the media content based on identifying the change of external objects in the space, the log information may be classified based on a second type (e.g., "event-change"). The operation of classifying the log information by the electronic device will be described in greater detail below with reference to FIG. 10.

Referring to FIG. 9, in case that an electronic device according to an embodiment receives an input from the user (operation 920—Yes), the electronic device may, in operation 930, identify whether a plurality of media contents for the external object indicated by the input should be obtained. For example, the input may include a voice signal referring to the external object. The input may include an voice signal indicating whether the size of the external object should be measured. The electronic device may identify the external object using the spatial information 224 of FIG. 2 and/or the user information 225 of FIG. 2.

Referring to FIG. 9, in case that the electronic device according to an embodiment should obtain the plurality of media contents (operation 930—Yes), the electronic device may check whether the size of the external object should be identified, in operation 940. The size of the external object may include the number of external objects, the height of the external object, and/or the weight of the external object.

Referring to FIG. 9, in case that the electronic device according to an embodiment should identify the size of the external object (operation 940—Yes), the electronic device may obtain the plurality of media contents for the external object and the log information on the external object. The electronic device may identify the size of the external object using the camera. The electronic device may obtain the plurality of media contents including the external object using the camera. The plurality of media contents may be referred to one or more external objects 706 and 708 of FIG. 7.

For example, the electronic device may identify the layout of the external object included in each of the plurality of media contents, based on obtaining the plurality of media contents. The electronic device may change the plurality of media contents based on the shape of the external object. The external object may be an example of the external object based on a specified motion. The electronic device may obtain the log information using time information when each of the plurality of media contents is obtained. For example, the electronic device may obtain the plurality of media contents, based on recording the external object, using the camera. However, it is not limited thereto. The log information may be classified based on a third type (e.g., "record-size"), in case that the electronic device obtains the plurality of media contents including information indicating the size of the external object.

Referring to FIG. 9, in case that the size of the external object is not required to be identified (operation 940—No), in operation 960, the electronic device according to an embodiment may obtain log information indicating the plurality of media contents for the external object. The log information may include time information when each of the plurality of media contents is obtained. The log information may include information indicating the external object based on the specified motion included in each of the plurality of media contents. The log information may be classified based on a fourth type (e.g., "record-scene"), in case that the electronic device obtains the plurality of media contents. For example, the log information may be classified based on the type of the external object. For example, in case that the external object includes at least a portion of space, the log information may be classified based on a fifth type (e.g., "record-location").

Referring to FIG. 9, in case that the plurality of media contents is not required to be obtained (operation 930—No), the electronic device according to an embodiment may check whether the size of the external object should be identified, in operation 970. Referring to FIG. 9, in case that the size of the external object should be identified (operation 970—Yes), in operation 980, the electronic device according to an embodiment may obtain one media content for the external object and log information on the size of the external object. The one media content may refer, for example, to an image including the external object obtained by the electronic device using the camera. The log information may be classified based on a sixth type (e.g., "object-size").

Referring to FIG. 9, in case that the size of the external object is not required to be identified (operation 970—No), the electronic device according to an embodiment may obtain log information corresponding to the one media content for the external object, in operation 990. The log information may be classified based on the type of the external object. For example, in case that the electronic device identifies the external object (e.g., a second user 106 of FIG. 1) using the user information 225 of FIG. 2, the log information may be classified based on a seventh type (e.g., "object-scene"). For example, in case that the electronic device identifies the external object (e.g., at least a portion of space) using the spatial information 224 of FIG. 2, the log information may be classified based on an eighth type (e.g., "object-location").

The electronic device according to an embodiment may receive an input indicating that media content corresponding to log information classified based on the above-described type is played. The electronic device may identify log information corresponding to the media content based on identifying the type corresponding to the input. Based on identifying the log information, the electronic device may project light representing the media content onto at least one flat surface, by controlling the projection assembly. A state in which the electronic device projects light representing the media content may be referred to at least one of states 305 and 310 of FIG. 3.

Hereinafter, in FIGS. 10 to 15, an operation in which an electronic device obtains the log information and/or the media content based on each type will be described in greater detail below.

Figure 10:
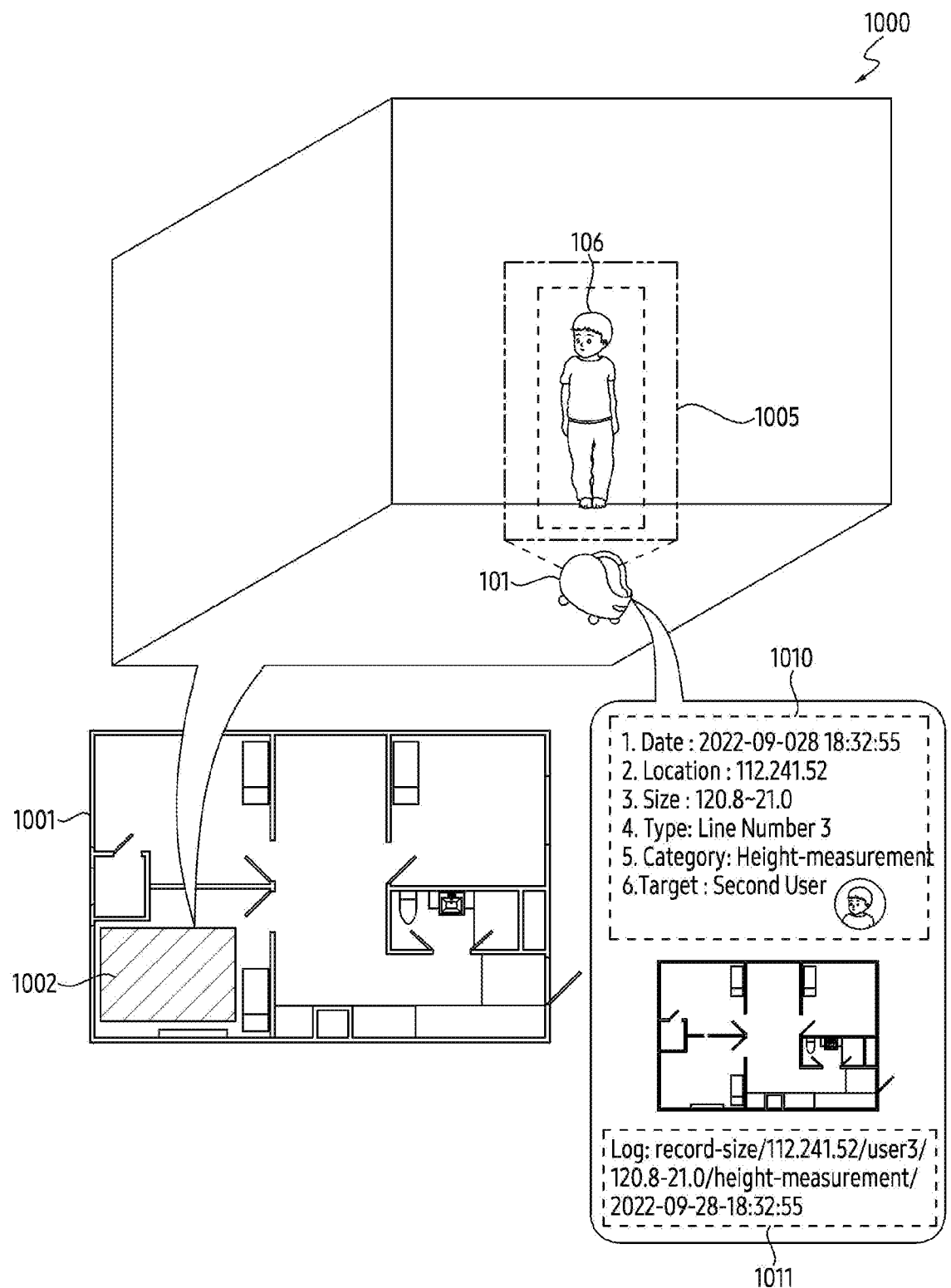
FIG. 10 is a diagram illustrating an example of an operation in which an electronic device obtains log information, according to an embodiment.

FIG. 10 is a diagram illustrating an example of an operation in which an electronic device obtains log information, according to an embodiment. An electronic device 101 of FIG. 10 may include the electronic device 101 of FIGS. 1 to 9. Referring to FIG. 10, a state 1000 in which the electronic device 101 according to an embodiment is located in at least a portion 1002 of a space 1001 is illustrated.

The electronic device 101 according to an embodiment may obtain log information 1011 based on performing at least one of operation 950 and/or operation 980 of FIG. 9 in the state 1000. For example, the electronic device 101 may initiate driving the camera, based on receiving a voice signal indicating identifying a size of a second user 106. The electronic device 101 may obtain media content 1005 for identifying the size of the second user 106, using the camera. A size of the media content 1005 may be referred to, for example, a field-of-view (FoV) of the electronic device 101. The media content 1005 may include a video and/or an image. For example, the form of the media content 1005 may be adjusted based on the form of the second user 106. For example, the electronic device 101 may remove at least a portion of the media content 1005 based on the form of the second user 106.

For example, the electronic device 101 may obtain the log information 1011 corresponding to the media content 1005, based on obtaining the media content 1005. The log information 1011 may be indicated like text information 1010.

For example, the electronic device 101 may change the form of the media content 1005 based on the form (or layout) of the second user 106, based on obtaining the media content 1005. The media content 1005 of which the form has been changed may be referred to an external object 706 of FIG. 7.

For example, the log information 1011 may include information on a time (e.g., "1. Date: 2022-09-28 18:32:55") when the media content 1005 was obtained. The log information 1011 may include information on a location (e.g., "2. Location: 112. 241. 52") where the media content 1005 was obtained. For example, the location may be identified based on a 3 dimensional coordinate system. For example, the information on the location may include an angle between the electronic device 101 and the second user 106. For example, the electronic device 101 may obtain information on the location using a communication circuit and/or a sensor (not illustrated). The electronic device 101 may obtain spatial information (e.g., spatial information 224 of FIG. 2). The electronic device 101 may identify the space 1001 and the at least a portion 1002 of the space using the spatial information. However, it is not limited thereto.

For example, the log information 1011 may include information on a size (e.g., "3. Size: 120.8") for the second user 106. For example, the 120.8 may be referred to the height of the second user 106. For example, the log information 1011 may include a type (e.g., "4. Type: Third Type") for classifying the log information. For example, the log information 1010 may include information indicating a state (e.g., "5. Category: Height-measurement") for the external object (e.g., the second user 106). The state for the external object may be obtained based on identifying the external object based on a specified motion. For example, the log information 1011 may include information (e.g., "6. Target: Second user") on the second user 106. For example, the log information may include information on the at least a portion 1002 of the space. However, it is not limited thereto. For example, the electronic device 101 may obtain log information including different data based on the type. For example, in case that the electronic device 101 obtains log information corresponding to one media content, the electronic device 101 may classify the log information based on the sixth type of FIG. 9.

The electronic device 101 according to an embodiment may transmit a signal including the log information 1011 and/or the media content 1005 corresponding to the log information, to a server (e.g., a server 201 of FIG. 2), using a communication circuit (e.g., a communication circuit 270 of FIG. 2). Based on transmitting the signal to the server, the electronic device 101 may share the log information 1011 and/or the media content 1005 with an external electronic device different from the electronic device 101. However, it is not limited thereto. The electronic device 101 may upload meta data indicating the log information 1011 and the media content 1005 to the server through the communication circuit.

For example, the electronic device 101 may receive feedback data on the size of the second user 106 from the server, based on transmitting the signal to the server. The feedback data may include information on the process of a second user's growth over time.

In case of identifying a user's input based on a specified time interval, the electronic device 101 according to an embodiment may identify the specified time interval by using the log information 1011. For example, the electronic device 101 may obtain a plurality of media contents for obtaining the size for the second user 106, and/or log information corresponding to each of the plurality of media contents, using the camera, based on the specified time interval. Based on identifying the specified time interval, the electronic device 101 may display at least one of the plurality of media contents, by controlling a projection assembly, in order to guide the user of the electronic device 101 to the specified time interval. However, it is not limited thereto. For example, the electronic device 101 may guide the specified time interval in order to guide the specified time interval using a speaker.

Figure 11:
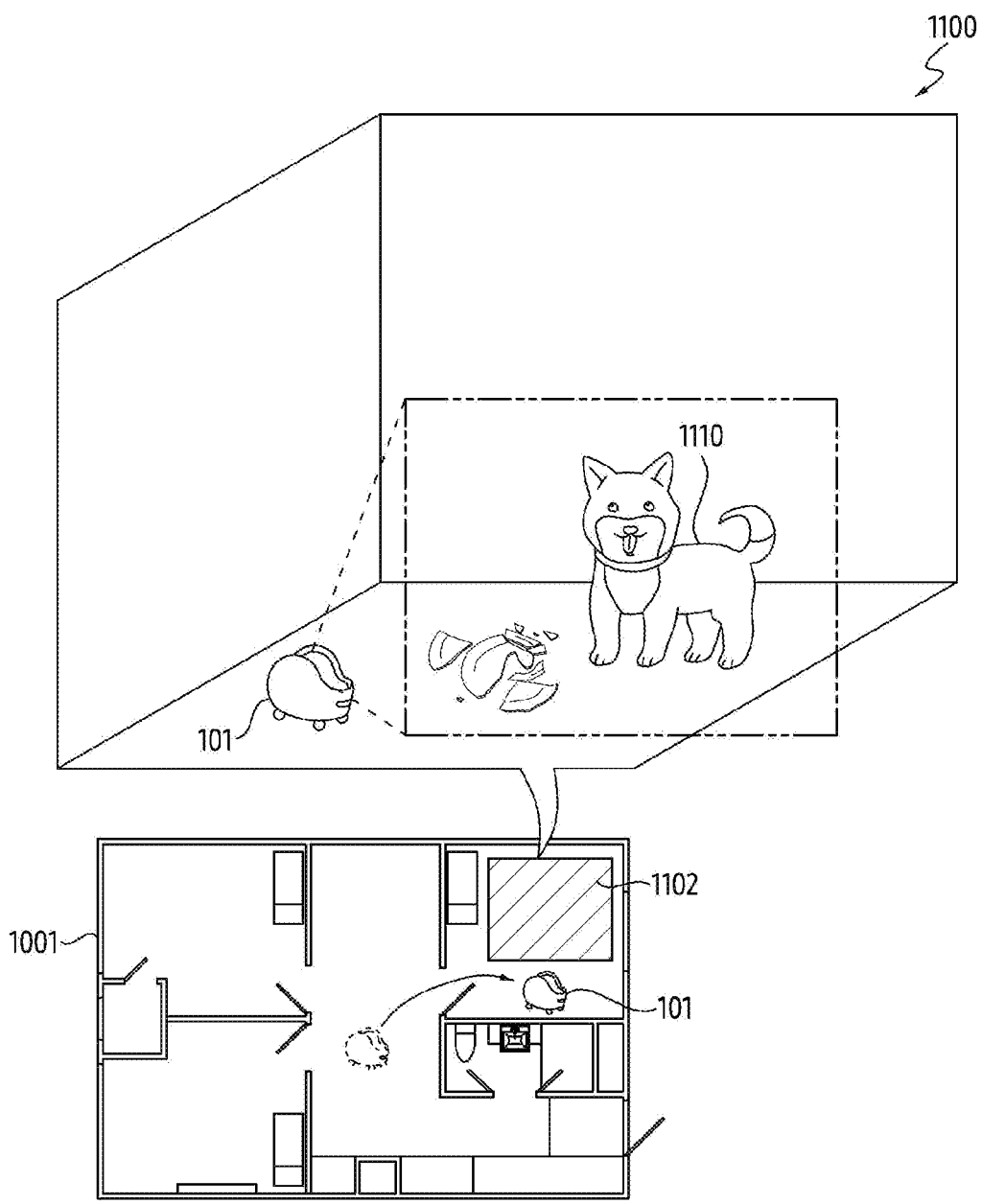
FIG. 11 is a diagram illustrating an example of an operation in which an electronic device obtains media content based on a specified event, according to an embodiment.
Figure 12:
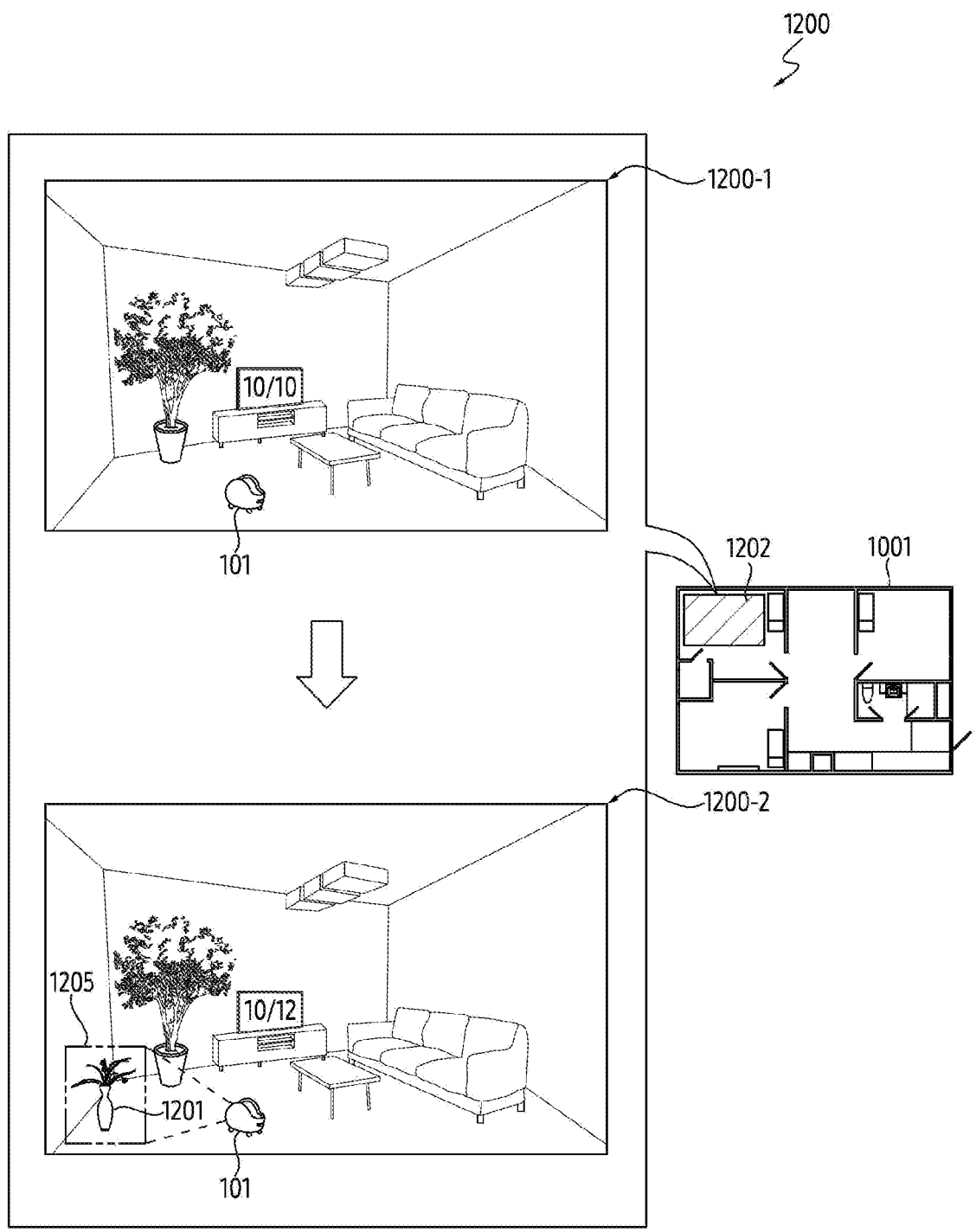
FIG. 12 is a diagram illustrating an example of an operation in which an electronic device obtains media content based on a specified event, according to an embodiment.

FIG. 11 is a diagram illustrating an example of an operation in which an electronic device obtains media content based on a specified event, according to an embodiment. FIG. 12 is a diagram illustrating an example of an operation in which an electronic device obtains media content based on a specified event, according to an embodiment. An electronic device 101 of FIGS. 11 and 12 may be an example of the electronic device 101 of FIGS. 1 to 10. Referring to FIGS. 11 and 12, states 1100 and 1200 in which the electronic device 101 according to an embodiment obtains at least one media content and/or log information corresponding to the at least one media content based on identifying a specified event are illustrated.

Referring to FIG. 11, in a state 1100, the electronic device 101 according to an embodiment may perform an operation corresponding to operation 921 of FIG. 9.

The electronic device 101 according to an embodiment may identify a sound signal that is greater than or equal to a specified threshold (e.g., decibel (dB)), using a microphone. The electronic device 101 may move to the location where the sound signal was generated, using an actuator, based on identifying the sound signal. The location may be included in at least a portion 1102 of space 1001. The electronic device 101 may obtain media content, using a camera, based on identifying the electronic device that has moved to the location. The media content may include an external object 1110 (e.g., an animal). For example, the electronic device 101 may obtain log information based on a first type of FIG. 9, based on obtaining the media content. The log information may include event information 223 of FIG. 2.

For example, although not illustrated, the electronic device 101 may identify at least a portion (e.g., an entrance) of the space that matches a sound signal (e.g., a doorbell sound), using spatial information 224. For example, based on identifying the sound signal, the electronic device 101 may move to at least a portion of the space, using the actuator. Based on moving to at least a portion of the space, the electronic device 101 may obtain media content including at least a portion of the space using a camera.

Referring to FIG. 12, in state 1200, the electronic device 101 according to an embodiment may identify a change of an external object located in at least a portion 1202 of the space, using external object information 222 of FIG. 2. For example, in state 1200-1, the electronic device 101 may obtain information (e.g., the external object information 222 of FIG. 2) on an external object located in at least a portion 1202 of the space, based on obtaining media content for at least a portion 1202 of the space using the camera.

For example, the electronic device 101 may identify an external object 1201, using the camera, in state 1200-2. The states 1200-1 and 1200-2 may be examples of states indicating at least a portion 1202 of the space 1001 based on different times. The electronic device 101 may identify a change of at least one external object located in the at least a portion 1202, using the obtained information on the external object. Based on identifying a change of the at least one external object, the electronic device 101 may identify the specified event. Based on identifying the specified event, the electronic device 101 may obtain media content 1205 for the external object 1201 using the camera.

For example, based on obtaining the media content 1205, the electronic device 101 may obtain log information corresponding to the media content 1205. For example, the electronic device 101 may obtain media content information (e.g., media content information 221 of FIG. 2) including the media content 1205. The media content information may include event information (e.g., the event information 223 of FIG. 2) related to the specified event and/or external object information (e.g., the external object information 222 of FIG. 2) on the external object 1201. For example, the electronic device 101 may classify the log information, based on a second type of FIG. 9.

For example, the electronic device 101 may receive a user's voice signal for finding the external object 1201 through the microphone. Based on receiving the voice signal, the electronic device 101 may guide the user to the location of the external object 1201, using at least one of the spatial information, the external object information, and/or the log information. For example, the electronic device 101 may transmit a signal indicating the location of the external object 1201 to a user's other external electronic device (e.g., a smartphone), using a communication circuit. However, it is not limited thereto.

As described above, the electronic device 101 according to an embodiment may obtain media content including the external object, based on identifying the specified event, independently of receiving user input. Based on obtaining the media content by identifying specified events, the electronic device 101 may provide media content indicating at least one event that generated in the space 1001 to the user, independently of the user's location in the space 1001.

Figure 13:
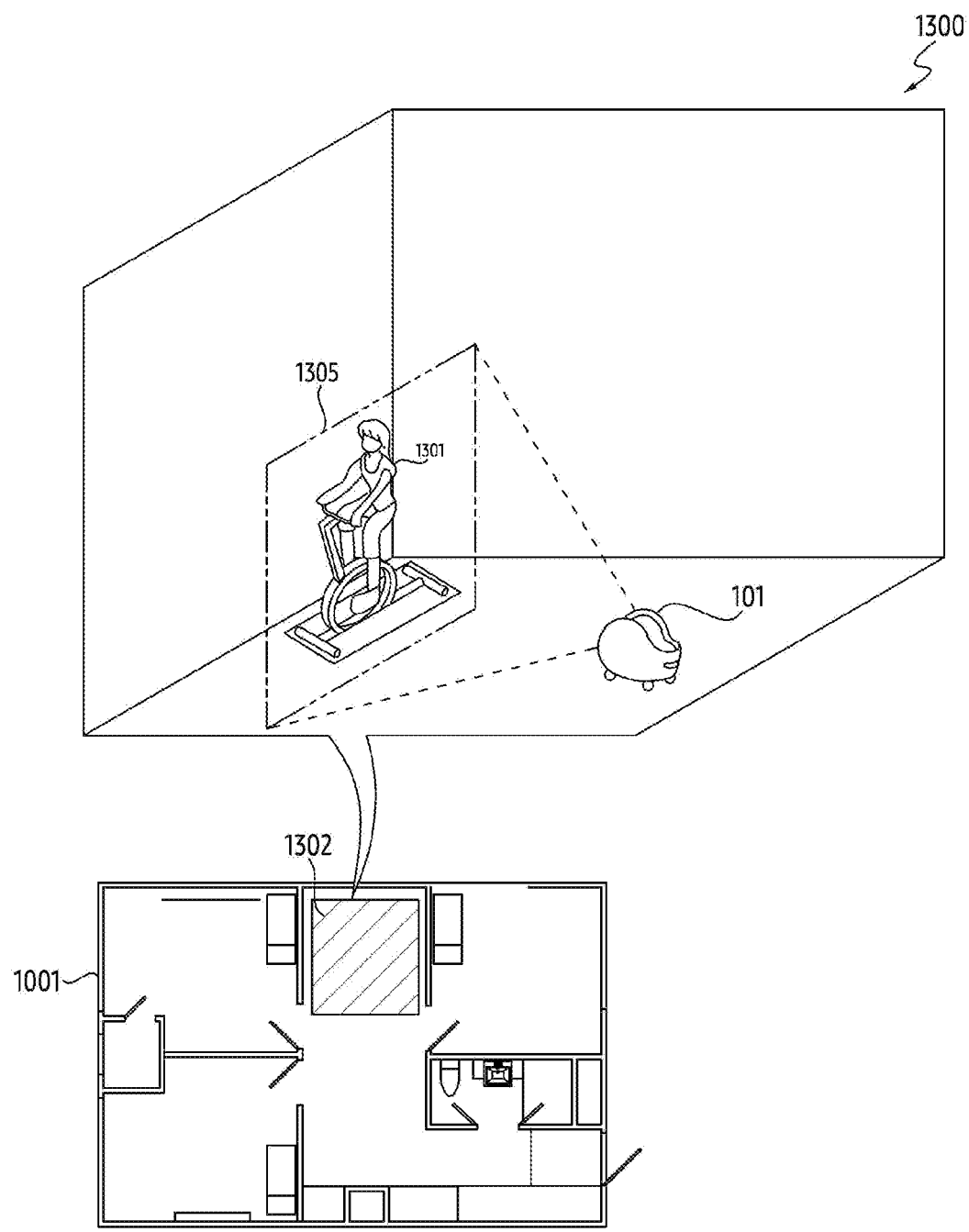
FIG. 13 is a diagram illustrating an example of an operation in which an electronic device obtains media content based on identifying a user based on a specified motion, according to an embodiment.

FIG. 13 is a diagram illustrating an example of an operation in which an electronic device obtains media content based on identifying a user based on a specified motion, according to an embodiment. An electronic device 101 of FIG. 13 may be an example of the electronic device 101 of FIGS. 1 to 12. Referring to FIG. 13, a state 1300 in which the electronic device 101 identifies a third user 1301 based on the specified motion is illustrated.

Referring to FIG. 13, in the state 1300, the electronic device 101 according to an embodiment may identify the third user 1301 located in at least a portion 1302 of the space 1001, using a camera. For example, the electronic device 101 may identify the third user 1301 based on the specified motion (e.g., a moving motion). The electronic device 101 may receive an input indicating obtaining media content indicating the third user 1301 performing the specified motion. In response to receiving the input, the electronic device 101 may obtain media content 1305 indicating the third user 1301. However, it is not limited thereto. For example, by identifying log information corresponding to the third user 1301 stored in the memory, the electronic device 101 may identify the third user 1301 based on the specified motion based on a specified time interval. Based on identifying the third user 1301 based on the specified motion based on the specified time interval, the electronic device 101 may obtain the media content 1305. For example, the specified motion may be referred to a state (e.g., category) for an external object of FIG. 10.

In case that the electronic device 101 according to an embodiment obtains a plurality of media contents including the media content 1305, the electronic device 101 may obtain log information based on a fourth type of FIG. 9. In case that the electronic device 101 obtains one media content 1305, the electronic device 101 may obtain log information based on a seventh type of FIG. 9.

The electronic device 101 according to an embodiment may output light indicating the obtained media content 1305, by controlling a projection assembly, in a direction adjacent to the third user 1301, based on identifying the third user 1301 based on the specified motion.

As described above, the electronic device 101 according to an embodiment may obtain media content indicating the user, based on identifying the user based on the specified motion. Log information corresponding to the media content may include information (e.g., category) corresponding to the specified motion. The electronic device 101 may obtain the media content based on identifying the user based on the specified motion, based on the specified time interval. The electronic device 101 may provide the user with information indicating repeated daily life by displaying the media content to the user.

Figure 14:
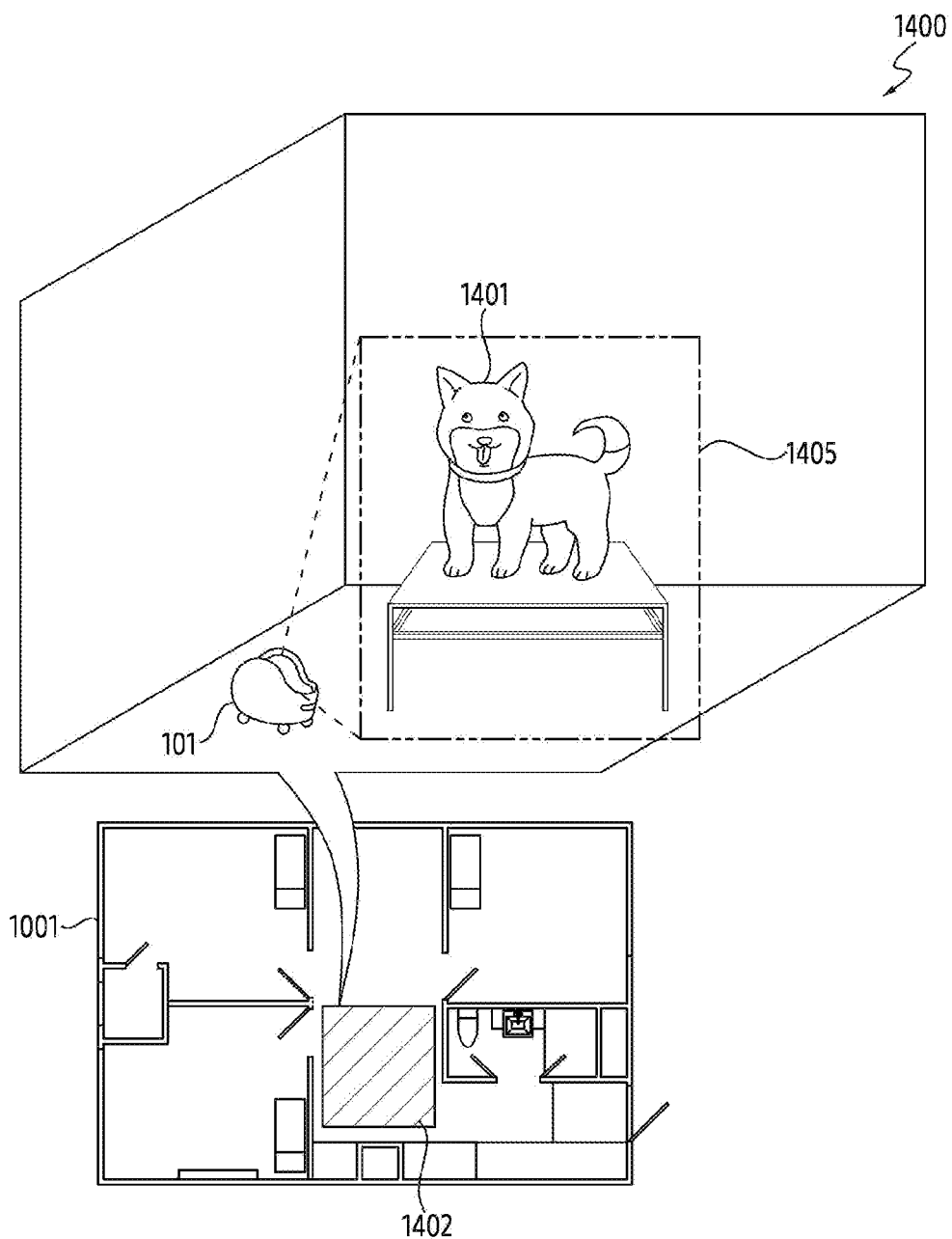
FIG. 14 is a diagram illustrating an example of an operation in which an electronic device obtains media content for an external object, according to an embodiment.

FIG. 14 is a diagram illustrating an example of an operation in which an electronic device obtains media content for an external object, according to an embodiment. An electronic device 101 of FIG. 14 may be an example of the electronic device 101 of FIGS. 1 to 13. Referring to FIG. 14, a state 1400 in which the electronic device 101 according to an embodiment has identified at least a portion 1402 of a space 1001 using a camera, is illustrated.

In state 1400, the electronic device 101 according to an embodiment may receive a voice signal indicating recording at least a portion 1402 of the space 1001, from a user (e.g., a first user 105 of FIG. 1). The electronic device 101 may obtain media content indicating at least a portion 1402, using the camera, in response to the voice signal.

For example, the electronic device 101 may receive a user's voice signal (e.g., "Keep taking pictures of dogs in the living room") indicating photographing an external object 1401, in at least a portion 1402. In response to the voice signal, the electronic device 101 may obtain media content 1405 indicating the external object 1401, using the camera. For example, in case that electronic device 101 obtains a plurality of media contents, the electronic device 101 may perform an operation corresponding to operation 960 of FIG. 9. Log information corresponding to each of the plurality of media contents may be classified based on a fifth type of FIG. 9. For example, in case that the electronic device 101 obtains one media content, the electronic device 101 may perform an operation corresponding to operation 990 of FIG. 9. Log information corresponding to the one media content may be classified based on an eighth type of FIG. 9. However, it is not limited thereto.

The electronic device 101 according to an embodiment may identify the movement of the external object 1401 while obtaining the media content 1405 using the camera. The electronic device 101 may track the external object 1401, using an actuator, based on identifying the movement of the external object 1401.

The electronic device 101 according to an embodiment may identify a specified motion (e.g., stress symptom) of the external object 1401 while obtaining the media content 1405. The electronic device 101 may guide the state for the external object 1401 to the user (e.g., the first user 105 in FIG. 1), based on identifying the specified motion.

For example, the electronic device 101 may output light indicating the media content 1405, by controlling the projection assembly, in at least a portion 1402 of the space 1001, based on receiving a user's voice signal (e.g., "What did the dog do in the living room today?") indicating playing the media content 1405.

Figure 15:
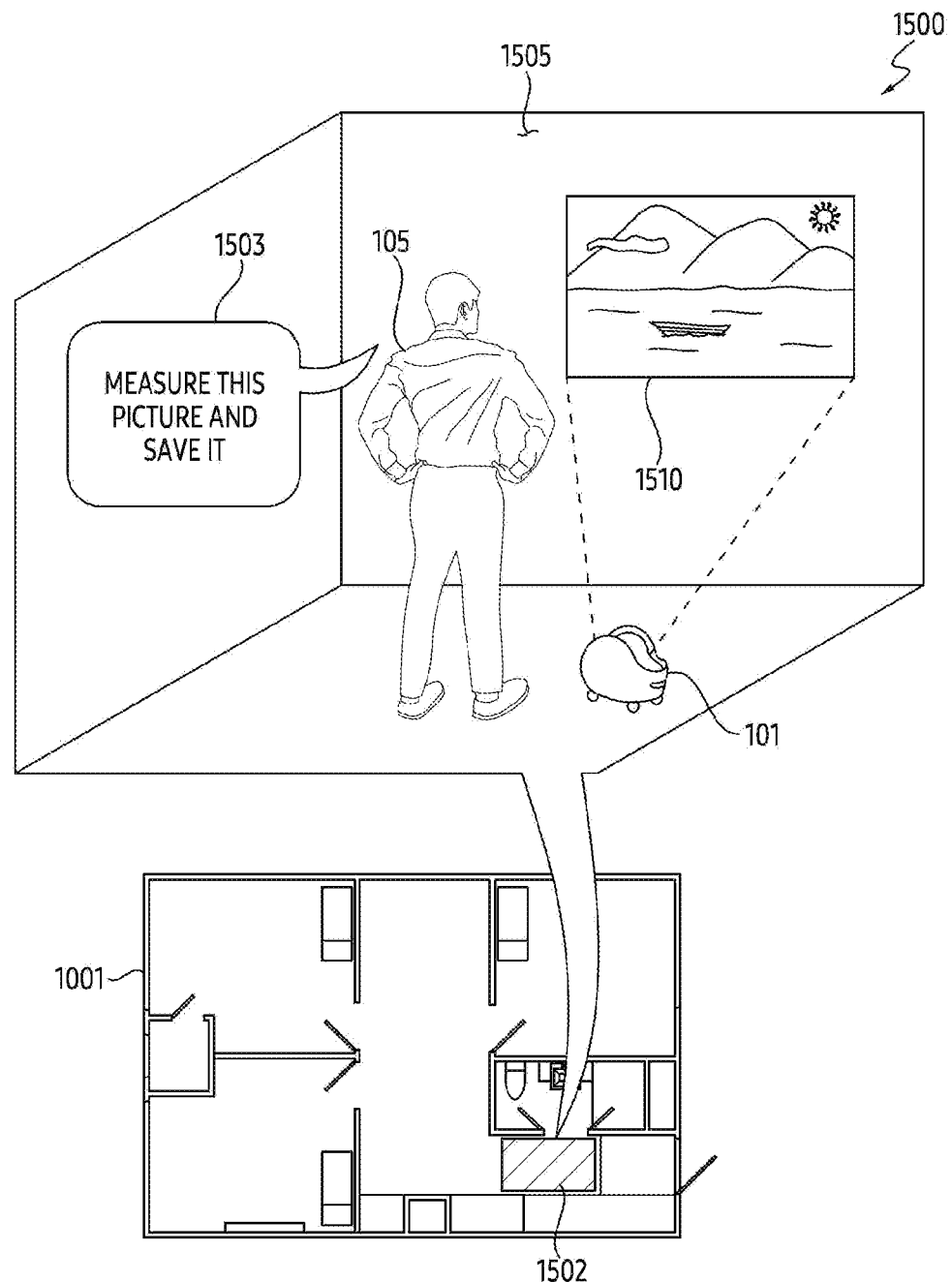
FIG. 15 is a diagram illustrating an example of an operation in which an electronic device obtains media content, according to an embodiment.

FIG. 15 is a diagram illustrating an example of an operation in which an electronic device obtains media content, according to an embodiment. An electronic device 101 of FIG. 15 may be an example of the electronic device 101 of FIGS. 1 to 14. Referring to FIG. 15, a state 1500 in which the electronic device 101 according to an embodiment initiates driving the camera based on receiving a voice signal 1503 of a first user 105, is illustrated.

The electronic device 101 according to an embodiment may receive, through a microphone, a voice signal 1503 (e.g., "Measure this picture and save it.") indicating obtaining media content indicating an external object 1510, in at least a portion 1502 of a space 1001. In response to receiving the voice signal, the electronic device 101 may obtain the media content indicating the external object 1510 using the camera.

The electronic device 101 according to an embodiment may obtain media content information and/or log information corresponding to the media content based on obtaining the media content indicating the external object 1510. The media content information may include information on the external object 1510. The log information may include spatial information on at least a portion 1502, information on a flat surface 1505 on which the external object 1505 is disposed, information indicating the size of the external object, and/or time information at which the media content was obtained. The log information may be indicated as log information 1011 of FIG. 10.

Although not illustrated, the electronic device 101 according to an embodiment may receive an input indicating playing the media content. For example, the electronic device 101 may receive a voice signal (e.g., "Show me a picture that was here a month ago.") from a first user 105. In response to receiving the voice signal, the electronic device 101 may output the media content based on the size of the external object 1510, by controlling a projection assembly, on the flat surface 1505.

Figure 16:
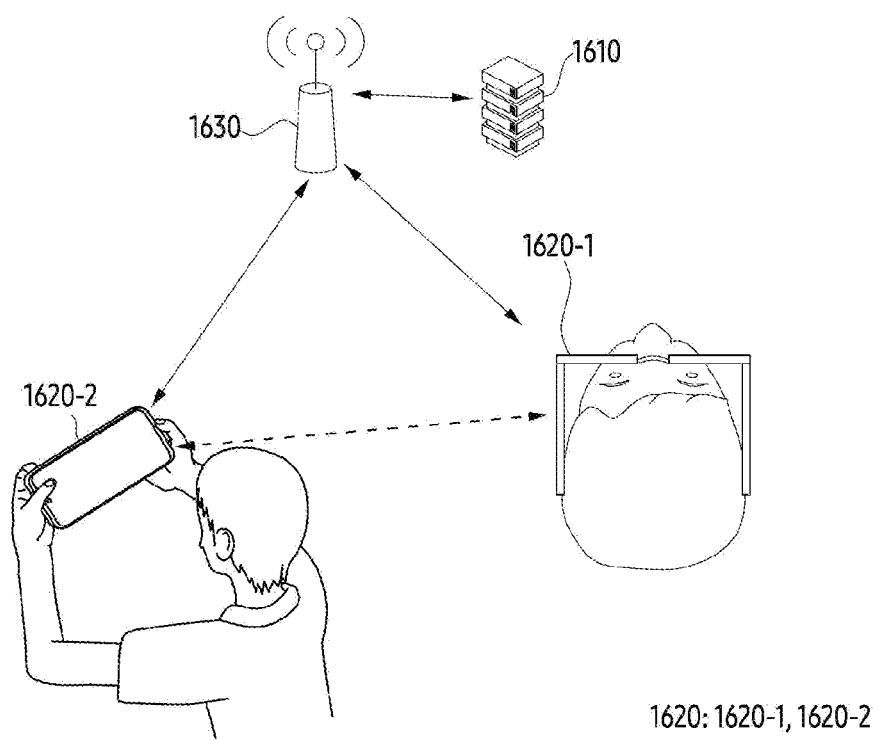
FIG. 16 is a diagram illustrating an example network environment related to a metaverse service according to an embodiment.

FIG. 16 is a diagram illustrating an example network environment related to a metaverse service according to an embodiment.

Metaverse is a compound word of the English word 'Meta' referring to 'virtual' or 'transcendence' and 'Universe' referring to universe, and may refer, for example, to a three-dimensional virtual world where social, economic, and cultural activities take place like the real world. The metaverse is a concept that is one step more evolved than virtual reality (VR, cutting-edge technology that allows people to have a realistic experience in a computer-generated virtual world), and has the characteristic of using an avatar not only to enjoy games or virtual reality, but also to engage in social and cultural activities similar to those in real life. The metaverse service may provide media content for enhancing immersion in the virtual world, based on augmented reality (AR), virtual reality (VR), mixed reality (MR) and/or extended reality (XR).

For example, the media content provided by the metaverse service may include social interaction content including avatar-based games, concerts, parties, and/or meetings. For example, the media content may include advertisements, user created content, and/or information for economic activities such as selling of productions and/or shopping. Ownership of the user created content may be proven by a blockchain-based non-fungible token (NFT). The metaverse service may support economic activities based on real currency and/or cryptocurrency. Through the metaverse service, virtual content linked to the real world, such as digital twin or life logging, may be provided.

FIG. 16 is a diagram illustrating an example network environment 1601 receiving a metaverse service through the server 1610.

Referring to FIG. 16, the network environment 1601 may include a server 1610, a user terminal 1620 (e.g., a first terminal 1620-1 and a second terminal 1620-2), and a network connecting the server 1610 with the user terminal 1620. In the network environment 1601, the server 1610 may provide the metaverse service to the user terminal 1620. The network may be formed by at least one intermediate node 1630 including an access point (AP) and/or a base station. The user terminal 1620 may output a user interface (UI) related to the metaverse service to the user of the user terminal 1620, by accessing the server 1620 through the network. Based on the UI, the user terminal 1620 may obtain information to be inputted to the metaverse service from the user or may output information (e.g., multimedia content) related to the metaverse service to the user.

In this case, the server 1610 provides a virtual space so that the user terminal 1620 may perform an activity in the virtual space. In addition, the user terminal 1620 represents information provided by the server 1610 to the user or transmits information that the user wishes to represent in the virtual space to the server, by installing a S/W agent to access the virtual space provided by the server 1610. The S/W agent may be provided directly through the server 1610, downloaded from a public server, or may be provided by being embedded when purchasing a terminal.

In an embodiment, the metaverse service may be provided to the user terminal 1620 and/or the user using the server 1610. The embodiment is not limited to this, and the metaverse service may be provided through individual contact between users. For example, within the network environment 1601, the metaverse service may be provided independently of the server 1610 by a direct connection between the first terminal 1620-1 and the second terminal 1620-2. Referring to FIG. 16, within the network environment 1601, the first terminal 1620-1 and the second terminal 1620-2 may be connected to each other through a network formed by at least one intermediate node 1630. In an embodiment in which the first terminal 1620-1 and the second terminal 1620-2 are directly connected, any one of the first terminal 1620-1 and the second terminal 1620-2 may perform the role of the server 1610. For example, a metaverse environment may be configured only by device-to-device connection (e.g., peer-to-peer (P2P) connection).

In an embodiment, the user terminal 1620 (or the user terminal 1620 including the first terminal 1620-1 or the second terminal 1620-2) may be made of various form factors, and may be characterized by including an output device that provides video or/and sound to the user and an input device for inputting information into the metaverse service. Examples of various form factors of the user terminal 1620 may include a smartphone (e.g., the second terminal 1620-2), an AR device (e.g., a first terminal 1620-1), a VR device, an MR device, a Video See Through (VST) device, an Optical See Through (OST) device, a smart lens, a smart mirror, TV or a projector capable of inputting and outputting.

The network (e.g., a network formed by at least one intermediate node 1630) of the present disclosure includes both various broadband networks including 3G, 4G, and 5G and a short-range network (e.g., a wired network or wireless network that directly connects the first terminal 1620-1 and the second terminal 1620-2) including Wifi, BT, and the like.

An electronic device according to an embodiment may identify a location to project media content, by controlling a projection assembly, using information on a space in which the electronic device is located. A method for the electronic device to obtain information on space may be required.

As described above, in an electronic device (e.g., an electronic device 101) according to an example embodiment, the electronic device may comprise: an actuator (e.g., an actuator 260) configured to move the electronic device, a sensor (e.g., a sensor 230), a projection assembly (e.g., the projection assembly 250) comprising light emitting circuitry, at least one processor (e.g., a processor 210), and a memory (e.g., a memory 220) storing instructions. The instructions, when executed by one or more of the at least one processor, may cause the electronic device to, in response to an input for playing a media content (e.g., a media content 221) stored in the memory, identify an external object (e.g., an external object 222) included in the media content. The instructions, when executed by one or more of the at least one processor, may cause the electronic device to, in a first state in which an external object adjacent to the electronic device is identified, emit a light representing the media content, facing a direction adjacent to the external object, by controlling the projection assembly, based on data of the sensor. The instructions, when executed by one or more of the at least one processor, may cause the electronic device to, in a second state distinct from the first state, based on identifying a space (e.g., a space 224) in which the media content is obtained, move to the space by controlling the actuator. The instructions, when executed by one or more of the at least one processor, may cause the electronic device to emit the light representing the media content, by controlling the projection assembly, based on identifying the electronic device moved to the space, using the data of the sensor.

For example, the electronic device may comprise a camera (e.g., a camera 240). The instructions, when executed by one or more of the at least one processor, may cause the electronic device to obtain the media content including the external object indicating a specified motion, using the camera. The instructions, when executed by one or more of the at least one processor, may cause the electronic device to store log information (e.g., log information 226) including at least one among information for the specified motion, information for time obtained the media content, information for the space, and the information for the external object. The instructions, when executed by one or more of the at least one processor, may cause the electronic device to emit the light representing the media content using the log information.

For example, the instructions, when executed by one or more of the at least one processor, may cause the electronic device to obtain a size of the external object, using the camera. The instructions, when executed by one or more of the at least one processor, may cause the electronic device to obtain the log information, using the obtained size of the external object.

For example, the instructions, when executed by one or more of the at least one processor, may cause the electronic device to adjust a size of the media content, based on the size of the external object. The instructions, when executed by one or more of the at least one processor, may cause the electronic device to emit the light representing the media content based on the adjusted size of the media content.

For example, the instructions, when executed by one or more of the at least one processor, may cause the electronic device to identify the space obtained the media content, using the log information.

For example, the instructions, when executed by one or more of the at least one processor, may cause the electronic device to identify a flat surface in the space on which to emit the media content, using the camera. The instructions, when executed by one or more of the at least one processor, may cause the electronic device to emit the light representing the media content based on a size of the identified the flat surface.

For example, the electronic device may comprise a speaker (e.g., a speaker 280). The external object adjacent to the flat surface may be a first external object. The instructions, when executed by one or more of the at least one processor, may cause the electronic device to, based on identifying a second external object different from the first external object using the camera, output information indicating the second external object through the speaker. The instructions, when executed by one or more of the at least one processor, may cause the electronic device to emit the light representing the media content on a second flat surface different from a first flat surface that is the flat surface.

For example, the electronic device may comprise a microphone (e.g., a microphone 290). The instructions, when executed by one or more of the at least one processor, may cause the electronic device to, based on identifying a specified sound signal using the microphone, move to the space in which the specified sound signal is generated, using the actuator. The instructions, when executed by one or more of the at least one processor, may cause the electronic device to obtain the media content, based on identifying the electronic device moved to the space.

As described above, in a method of operating an electronic device (e.g., an electronic device 101), the method may comprise, in response to an input for playing a media content (e.g., a media content 221) stored in a memory (e.g., a memory 220), identifying an external object (e.g., an external object 222) included in the media content. The method may comprise, in a first state in which an external object adjacent to the electronic device is identified, emitting a light representing the media content, facing a direction adjacent to the external object, by controlling a projection assembly (e.g., a projection assembly 250), based on data of the sensor (e.g., a sensor 230). The method may comprise, in a second state distinct from the first state, based on identifying a space (e.g., a space 224) in which the media content is obtained, moving to the space controlling an actuator. The method may comprise emitting the light representing the media content, by controlling the projection assembly, based on identifying the electronic device moved to the space, using the data of the sensor.

For example, emitting the light may comprise obtaining the media content including the external object indicating a specified motion, using a camera (e.g., a camera 240). Emitting the light may comprise storing log information (e.g., log information 226) including at least one among information for the specified motion, information for time obtained the media content, information for the space, and the information for the external object. Emitting the light may comprise emitting the light representing the media content using the log information.

For example, storing the log information may comprise obtaining a size of the external object, using the camera. Storing the log information may comprise obtaining the log information, using the obtained size of the external object.

For example, emitting the light may comprise adjusting a size of the media content, based on the size of the external object. Emitting the light may comprise emitting the light representing the media content based on the adjusted size of the media content.

For example, moving to the space may comprise identifying the space obtained the media content, using the log information.

For example, emitting the light may comprise identifying a flat surface in the space on which to emit the media content, using the camera. Emitting the light may comprise emitting the light representing the media content based on a size of the identified the flat surface.

For example, external object adjacent to the flat surface may be a first external object. Emitting the light may comprise, based on identifying a second external object different from the first external object using the camera, outputting information indicating the second external object through a speaker (e.g., a speaker 280). Emitting the light may comprise emitting the light representing the media content on a second flat surface different from a first flat surface that is the flat surface.

For example, Identifying the external object may comprise, based on identifying a specified sound signal using a microphone (e.g., a microphone 290), moving to the space in which the specified sound signal is generated, using the actuator. Identifying the external object may comprise obtaining the media content, based on identifying the electronic device moved to the space.

As described above, a non-transitory computer readable storage medium storing one or more programs, the one or more programs, when executed by one or more of at least one processor (e.g., a processor 210) of an electronic device (e.g., an electronic device 101), may cause the electronic device to, in response to an input for playing a media content (e.g., a media content 221) stored in a memory (e.g., a memory 220), identify an external object included in the media content. The one or more programs, when executed by one or more of the at least one processor of the electronic device, may cause the electronic device to, in a first state in which an external object adjacent to the electronic device is identified, emit a light representing the media content, facing a direction adjacent to the external object, by controlling a projection assembly (e.g., a projection assembly 250), based on data of a sensor (e.g., a sensor 230). The one or more programs, when executed by one or more of the at least one processor of the electronic device, may cause the electronic device to, in a second state distinct from the first state, based on identifying a space in which the media content is obtained, move to the space by controlling an actuator (e.g., an actuator 260). The one or more programs, when executed by one or more of the at least one processor of the electronic device, may cause the electronic device to emit the light representing the media content, by controlling the projection assembly, based on identifying the electronic device moved to the space, using the data of the sensor. For example, the one or more programs, when executed by one or more of the at least one processor of the electronic device, may cause the electronic device to obtain the media content including the external object indicating a specified motion, using a camera (e.g., a camera 240). The one or more programs, when executed by one or more of the at least one processor of the electronic device, may cause the electronic device to store log information (e.g., log information 226) including at least one among information for the specified motion, information for time obtained the media content, information for the space, and the information for the external object. The one or more programs, when executed by one or more of the at least one processor of the electronic device, may cause the electronic device to emit the light representing the media content using the log information.

For example, the one or more programs, when executed by one or more of the at least one processor of the electronic device, may cause the electronic device to obtain a size of the external object, using the camera. The one or more programs, when executed by one or more of the at least one processor of the electronic device, may cause the electronic device to obtain the log information, using the obtained size of the external object.

For example, the one or more programs, when executed by one or more of the at least one processor of the electronic device, may cause the electronic device to adjust a size of the media content, based on the size of the external object. The one or more programs, when executed by one or more of the at least one processor of the electronic device, may cause the electronic device to emit the light representing the media content based on the adjusted size of the media content.

The device described above may be implemented as a hardware component, a software component, and/or a combination of a hardware component and a software component. For example, the devices and components described in the embodiments may be implemented using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a non-transitory computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include may be those configured to store program instructions, including a magnetic medium such as a hard disk, floppy disk, and magnetic tape, optical recording medium such as a CD-ROM and DVD, magneto-optical medium, such as a floptical disk, and ROM, RAM, flash memory, and the like. In addition, examples of other media may include recording media or storage media managed by app stores that distribute applications, sites that supply or distribute various software, servers, and the like.

As described above, although the embodiments have been described with reference to various examples and drawings, one of ordinary skill in the art will understand that various modifications falling within the scope of the disclosure may be made. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

Therefore, it will be understood that various other implementations, other embodiments, and those equivalent thereto, fall within the scope of the disclosure, including the appended claims. It will also be understood that any of the embodiment(s) described herein may be used in connection with any other embodiment(s) described herein.

What is claimed is:

1. An electronic device, comprising:
an actuator configured to move the electronic device;
a sensor configured to obtain position information indicating a first position where the electronic device is positioned;
a projection assembly comprising light emitting circuitry;
at least one processor comprising processing circuitry; and
memory comprising one or more storage mediums storing instructions,
wherein the instructions, when executed by one or more of the at least one processor, cause the electronic device to:
in response to an input for playing a media content stored in the memory, identify an external object corresponding to a visual object included in the media content;
in a first state in which the external object adjacent to the electronic device is identified, emit a light representing the media content, facing a direction adjacent to the external object, by controlling the projection assembly, based on the position information; and
in a second state distinct from the first state;
based on identifying a second position where the media content is obtained, move the electronic device from the first position to the second position by controlling the actuator based on the position information; and
emit the light representing the media content at the second position moved from the first position, by controlling the projection assembly.

2. The electronic device of claim 1, further comprising:
a camera,
wherein the instructions that, when executed by one or more of the at least one processor, cause the electronic device further to:
photograph, using the camera, the external object taking a specified motion, to obtain the media content;
store log information related to at least one among the specified motion, time when the media content is obtained, the second position where the media content is obtained, and the external object; and
emit the light representing the media content using the log information.

3. The electronic device of claim 2,
wherein the instructions that, when executed by one or more of the at least one processor, cause the electronic device further to:
obtain a size of the external object, using the camera; and
obtain the log information, using the obtained size of the external object.

4. The electronic device of claim 3,
wherein the instructions that, when executed by one or more of the at least one processor, cause the electronic device further to:
adjust a size of an area on which the media content is projected by emitting the light representing the media content, based on the size of the external object; and
emit the light representing the media content based on the adjusted size of the media content.

5. The electronic device of claim 2,
wherein the instructions that, when executed by one or more of the at least one processor, cause the electronic device further to:
identify the second position where the media content is obtained, using the log information.

6. The electronic device of claim 2,
wherein the instructions that, when executed by one or more of the at least one processor, cause the electronic device further to:
identify a flat surface toward which the projection assembly emits the light representing the media content at the second position, using the camera; and
emit the light representing the media content based on a size of the identified flat surface.

7. The electronic device of claim 6, further comprising:
a speaker,
wherein the external object adjacent to the flat surface includes a first external object; and
wherein the instructions that, when executed by one or more of the at least one processor, cause the electronic device further to:
based on identifying a second external object different from the first external object using the camera, output information indicating the second external object through the speaker; and
emit the light representing the media content on a second flat surface different from a first flat surface that is the flat surface.

8. The electronic device of claim 2, further comprising:
a microphone, and
wherein the instructions that, when executed by one or more of the at least one processor, cause the electronic device further to:

based on identifying a specified sound signal using the microphone, move the electronic device to the second position in which the specified sound signal is generated, using the actuator; and obtain the media content, based on identifying the electronic device moved to the second position.

9. The electronic device of claim 1,
wherein the instructions that, when executed by one or more of the at least one processor, cause the electronic device further to:
in the first state in which the external object adjacent to the electronic device is identified, emit the light representing the media content, to be projected on an area, and
wherein the area including a shadow area of the external object positioned between the projection assembly and the area.

10. A method of operating an electronic device, comprising:
in response to an input for playing a media content stored in a memory, identifying an external object corresponding to a visual object included in the media content;
in a first state in which the external object adjacent to the electronic device is identified, emitting a light representing the media content, facing a direction adjacent to the external object, by controlling a projection assembly, based on position information, obtained by a sensor, and indicating a first position where the electronic device is positioned; and
in a second state distinct from the first state;
based on identifying a second position where the media content is obtained, moving the electronic device from the first position to the second position by controlling an actuator based on the position information; and
emitting the light representing the media content at the second position moved from the first position, by controlling the projection assembly.

11. The method of claim 10, wherein emitting the light further comprises:
photographing, using the camera, the external object taking a specified motion, to obtain the media content,
storing log information related to at least one among the specified motion, time when the media content is obtained, the second position where the media content is obtained, and the external object, and
emitting the light representing the media content using the log information.

12. The method of claim 11, wherein storing the log information further comprises:
obtaining a size of the external object, using the camera, and
obtaining the log information, using the obtained size of the external object.

13. The method of claim 12, wherein emitting the light further comprises:
adjusting a size of an area on which the media content is projected by emitting the light representing the media content, based on the size of the external object, and
emitting the light representing the media content based on the adjusted size of the media content.

14. The method of claim 11, wherein moving the electronic device from the first position to the second position further comprises:
identifying the second position where the media content is obtained, using the log information.

15. The method of claim 11, wherein emitting the light further comprises:
identifying a flat surface toward which the projection assembly emits the light representing the media content at the second position, using the camera; and
emitting the light representing the media content based on a size of the identified the flat surface.

16. The method of claim 15,
wherein the external object adjacent to the flat surface includes a first external object; and
wherein emitting the light further comprises:
based on identifying a second external object different from the first external object using the camera, outputting information indicating the second external object through a speaker; and
emitting the light representing the media content on a second flat surface different from a first flat surface that is the flat surface.

17. The method of claim 11,
wherein identifying the external object further comprises:
based on identifying a specified sound signal using a microphone, moving the electronic device to the second position in which the specified sound signal is generated, using the actuator; and
obtaining the media content, based on identifying the electronic device moved to the second position.

18. An electronic device, comprising:
an actuator configured to move the electronic device;
a sensor configured for obtaining position information indicating where the electronic device is positioned;
a projection assembly comprising light emitting circuitry;
at least one processor comprising processing circuitry; and
memory comprising one or more storage mediums storing instructions,
wherein the instructions that, when executed by one or more of the at least one processor, cause the electronic device to:
in response to an input for playing a media content, identify a position at which the projection assembly emit a light representing the media content toward an area;
in a case where a first position where the media content is obtained is identified:
control the actuator to move the electronic device to the first position using the position information, and
emit, through the projection assembly at the first position, the light representing the media content; and
in a case where a second position different from the first position is identified, emit, through the projection assembly at the second position, the light representing the media content.

19. The electronic device of claim 18, wherein the instructions that, when executed by one or more of the at least one processor, cause the electronic device to:
identify an external object corresponding to a visual object included in the media content;
in response to the external object being identified, identify the second position at which the projection assembly emits the light representing the media content; and
in response to the external object not being identified, identify the first position at which the projection assembly emits the light representing the media content.

20. The electronic device of claim 19, wherein the instructions that, when executed by one or more of the at least one processor, cause the electronic device to:

identify an external object corresponding to a visual object included in the media content;

in response to the external object being identified, identify the second position at which the projection assembly emits the light representing the media content; and in response to the external object not being identified, identify the first position at which the projection assembly emits the light representing the media content.

* * * * *